US012269262B2

(12) United States Patent
Morita

(10) Patent No.: US 12,269,262 B2
(45) Date of Patent: Apr. 8, 2025

(54) INKJET PRINTING APPARATUS, CONTROL METHOD, AND STORAGE MEDIUM

(71) Applicant: CANON KABUSHIKI KAISHA, Tokyo (JP)

(72) Inventor: Seijiro Morita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 18/180,286

(22) Filed: Mar. 8, 2023

(65) Prior Publication Data

US 2023/0311495 A1 Oct. 5, 2023

(30) Foreign Application Priority Data

Mar. 30, 2022 (JP) ................................ 2022-056148

(51) Int. Cl.
*B41J 2/045* (2006.01)
*B41J 2/14* (2006.01)

(52) U.S. Cl.
CPC ......... *B41J 2/04541* (2013.01); *B41J 2/0455* (2013.01); *B41J 2/04581* (2013.01); *B41J 2/04591* (2013.01); *B41J 2002/14491* (2013.01)

(58) Field of Classification Search
CPC .................................................... B41J 2/04581
See application file for complete search history.

(56) References Cited

U.S. PATENT DOCUMENTS

| | | | | |
|---|---|---|---|---|
| 2012/0229541 | A1* | 9/2012 | Satoh | B41J 2/04581 347/10 |
| 2015/0091960 | A1* | 4/2015 | Nakazawa | B41J 2/04541 347/10 |
| 2018/0178511 | A1* | 6/2018 | Kashimura | B41J 2/14233 |
| 2019/0092001 | A1* | 3/2019 | Furukawa | B41J 2/04541 |
| 2019/0375207 | A1* | 12/2019 | Korthuis | B41J 2/0458 |

FOREIGN PATENT DOCUMENTS

| | | |
|---|---|---|
| JP | 2017-149153 A | 8/2017 |

* cited by examiner

*Primary Examiner* — Shelby L Fidler
(74) *Attorney, Agent, or Firm* — Venable LLP

(57) ABSTRACT

An object of the present disclosure is to narrow the width of an electric wiring substrate and downsize a printing head. An aspect of the present disclosure provides an inkjet printing apparatus, including: a printing head including a plurality of nozzles ejecting ink and a piezoelectric element corresponding to each of the plurality of the nozzles; a control unit configured to control printing by the printing head; a signal generation unit configured to generate a driving signal to drive the piezoelectric element; a selection unit configured to select for each nozzle one type of the driving signal out of a plurality of types of the driving signals generated by the signal generation unit; and a plurality of wiring lines having different wiring widths from each other to communicate the plurality of types of the driving signals supplied to the selection unit from the signal generation unit.

15 Claims, 26 Drawing Sheets

FIG.9
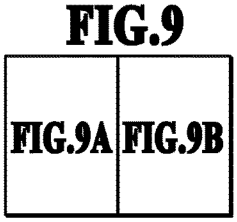
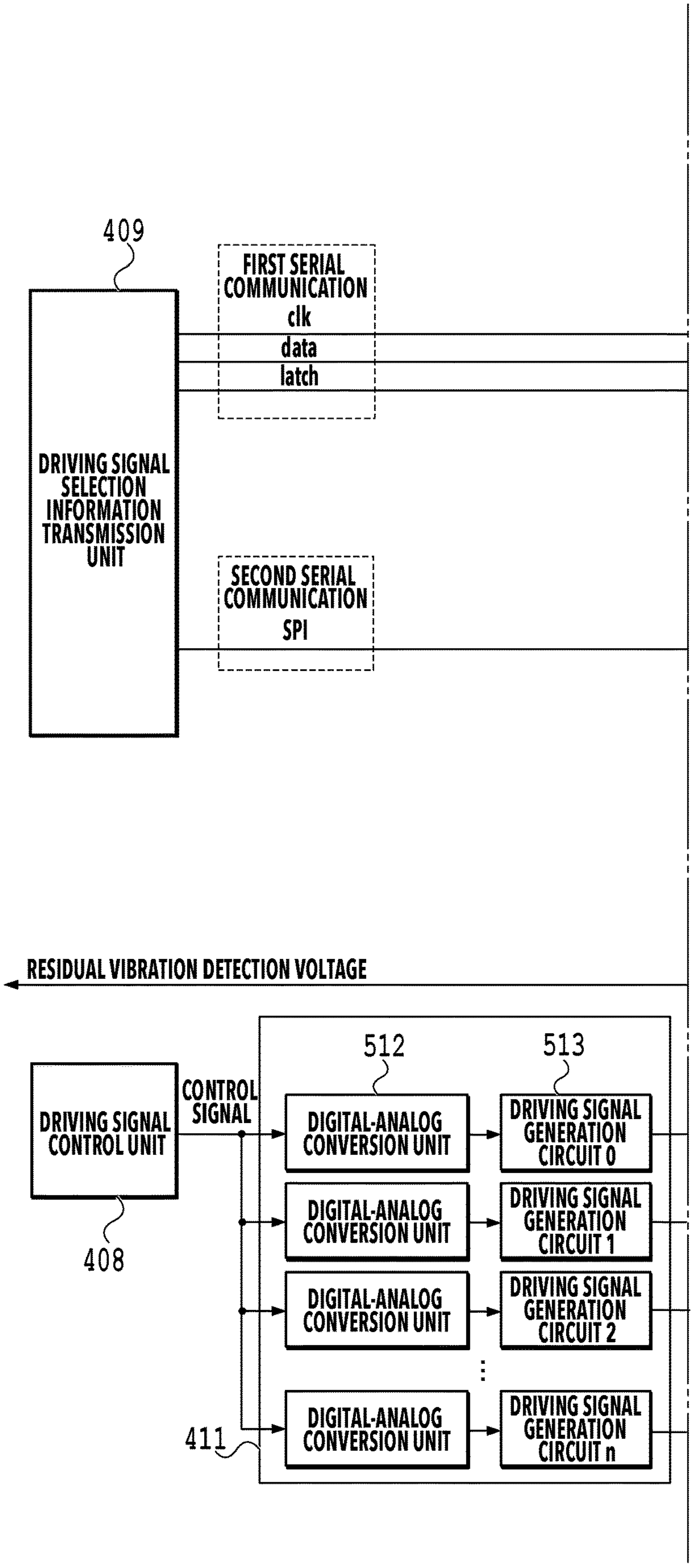
FIG.9A

| i | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| drive_tab [0] | 153 | 153 | 153 | 153 | 153 | 153 | 153 | 153 | 153 | 153 | 153 | 153 | 153 | 153 |
| drive_tab [1] | 153 | 128 | 102 | 77 | 51 | 26 | 0 | 0 | 0 | 0 | 0 | 0 | 0 | 18 |
| drive_tab [2] | 153 | 138 | 123 | 109 | 94 | 79 | 64 | 64 | 64 | 64 | 64 | 64 | 64 | 70 |

FIG.18

| i | 0 | 1 | 2 |
|---|---|---|---|
| pri_tab | 1 | 0 | 2 |

FIG.21A

| i | 0 | 1 | 2 |
|---|---|---|---|
| pri_tab | 0 | 1 | 2 |

FIG.21B

| i | 0 | 1 | 2 |
|---|---|---|---|
| pri_tab | 0 | 2 | 1 |

FIG.21C

| i | 0 | 1 | 2 |
|---|---|---|---|
| pri_tab | 0 | 1 | 2 |

FIG.21D

INKJET PRINTING APPARATUS, CONTROL METHOD, AND STORAGE MEDIUM

BACKGROUND

Field

The present disclosure relates to a technique for a printing apparatus such as a copier and a printer and particularly relates to a technique effective for an inkjet type printing apparatus using a piezoelectric element.

Description of the Related Art

Japanese Patent Laid-Open No. 2017-149153 discloses an inkjet type printing apparatus including a driving signal selection unit to select a driving signal near a piezoelectric element that ejects ink. One driving signal out of multiple driving signals is selected by the driving signal selection unit, and the piezoelectric element is driven based on the selected one driving signal.

The printing apparatus in Japanese Patent Laid-Open No. 2017-149153 includes wiring lines for signal supply corresponding to the multiple driving signals to supply the multiple driving signals to the driving signal selection unit, and the wiring lines have comparable widths. This is because it is necessary to prepare a wiring width corresponding to the maximum current expected so as to be able to drive the maximum number of driving elements that can be simultaneously driven in a case of using any wiring lines.

SUMMARY

However, in Japanese Patent Laid-Open No. 2017-149153, as a result of setting the wiring widths of all the wiring lines for signal supply to a wiring width corresponding to the maximum current, the width of an electric wiring substrate is increased, and thus there has been a problem of an increase in the width of a printing head.

Therefore, an object of the present disclosure is to narrow the width of an electric wiring substrate and downsize a printing head.

An aspect of the present disclosure provides an inkjet printing apparatus, including: a printing head including a plurality of nozzles ejecting ink and a piezoelectric element corresponding to each of the plurality of the nozzles; a control unit configured to control printing by the printing head; a signal generation unit configured to generate a driving signal to drive the piezoelectric element; a selection unit configured to select for each nozzle one type of the driving signal out of a plurality of types of the driving signals generated by the signal generation unit; and a plurality of wiring lines having different wiring widths from each other to communicate the plurality of types of the driving signals supplied to the selection unit from the signal generation unit, in which the control unit controls the signal generation unit by using use frequency information indicating each type of use frequency of the plurality of types of the driving signals, and the control unit controls the selection unit by using the use frequency information.

Further features of the present invention will become apparent from the following description of exemplary embodiments with reference to the attached drawings.

BRIEF DESCRIPTION OF THE DRAWINGS

FIG. 9 is a diagram showing a relationship between FIGS. 9A and 9B;

FIGS. 9A and 9B are a diagram illustrating a configuration and an operation of a driving signal selection unit;

FIG. 18 is a diagram describing a driving signal control table used by a driving signal generation unit;

FIGS. 21A to 21D are diagrams describing use frequency information;

DESCRIPTION OF THE EMBODIMENTS

Figure 1:
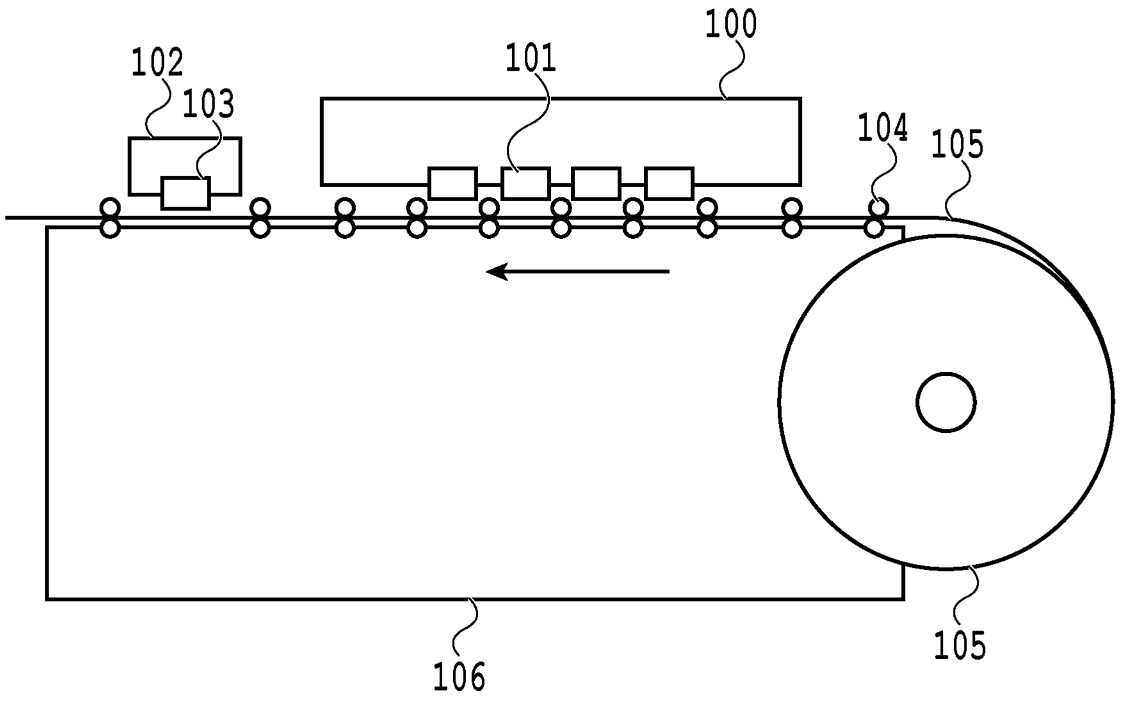
FIG. 1 is a schematic view illustrating an overall configuration of an inkjet printing apparatus.

Preferred embodiments of the present disclosure are described in detail below with reference to the appended drawings. Unless stated otherwise, the same reference numerals indicate the same or corresponding portions throughout the drawings. Note that, the characteristics described below are not intended to unnecessarily limit the invention according to the scope of claims, and not all the combinations of the characteristics are essential for the means for solving the problems of the present disclosure.

<Overall Configuration of Inkjet Printing Apparatus>

FIG. 1 is a side cross-sectional view illustrating a configuration of a printing apparatus that performs printing on a roll-shaped printing medium such as roll paper by using a full line-inkjet printing head as an example of an inkjet type printing apparatus.

The full line-inkjet printing head (hereinafter, simply referred to as a "printing head") is a printing head having a printing width equal to or greater than the length of the roll paper in a width direction.

In general, the printing apparatus includes a housing 106, a head unit 100, first to fourth printing heads 101 corresponding to, for example, four colors of cyan (C), magenta (M), yellow (Y), and black (K), a scanner unit 102, a line scanner 103, and conveyance rollers 104.

Roll paper 105 used as the printing medium is nipped by a pair of the conveyance rollers 104 and conveyed in an arrow direction such that printing is sequentially performed thereon immediately below each of the first to fourth printing heads 101.

<Configuration of Printing Head>

A piezoelectric element that functions as an ejection energy generation element is a unit that ejects ink from a nozzle in the printing head 101. There has been known a method of generating a pressure in a pressure chamber by using the piezoelectric element and ejecting a liquid in the pressure chamber by the pressure from the nozzle formed at one end of the pressure chamber. The printing head 101 as described above includes an electric contact in each piezoelectric element, and the ejection is performed by a connection with an integrated circuit that generates a driving signal and driving the piezoelectric element by the driving signal.

Figure 2:
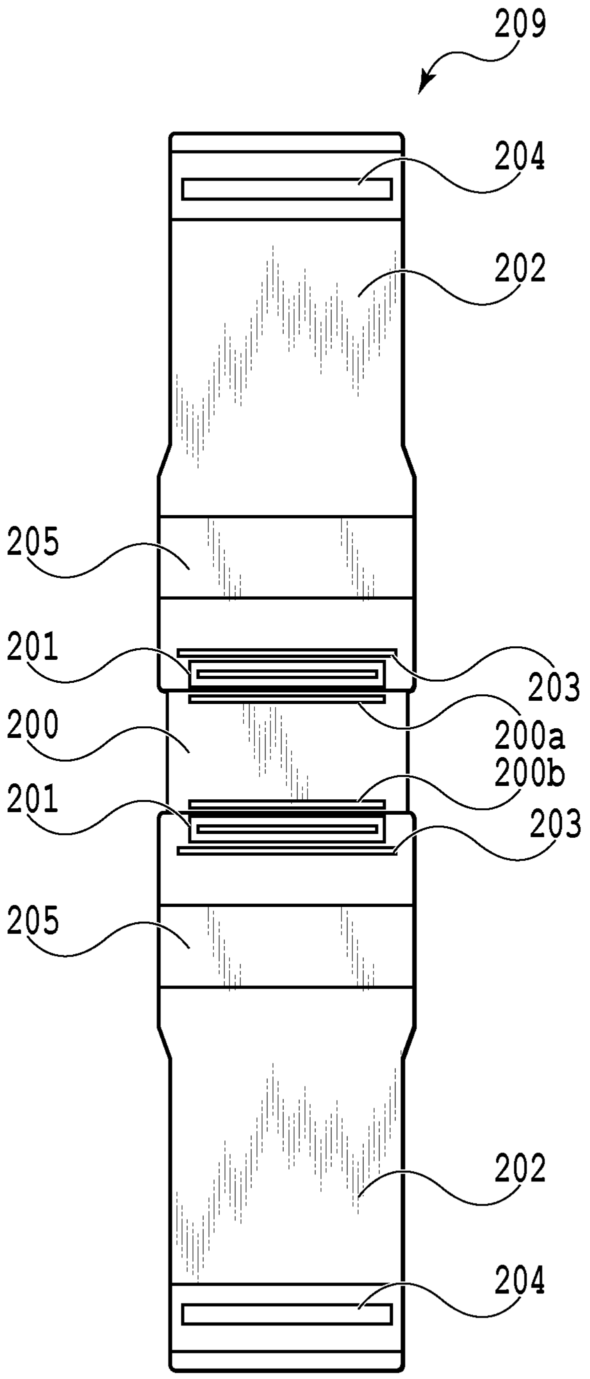
FIG. 2 is a schematic view illustrating a chip unit forming an inkjet printing head.

FIG. 2 is a schematic view of a chip unit 209 that is a combination of a piezoelectric element substrate 200, a driving signal selection unit 201, and a flexible electric wiring substrate 202. The piezoelectric element substrate 200 includes a first terminal 200*a* and a second terminal 200*b* that are each electrically connected with a not-illustrated terminal provided to the driving signal selection unit 201 mounted on the flexible electric wiring substrate 202. The flexible electric wiring substrate 202 includes a selection unit side terminal 203 and is electrically connected with a not-illustrated wiring substrate side terminal provided to the driving signal selection unit 201.

The flexible electric wiring substrate 202 includes a capacitor mounting unit 205 to mount a bypass capacitor for power supply of the driving signal selection unit 201 and a head substrate connection unit 204 connected to a not-illustrated head substrate.

Figure 3:
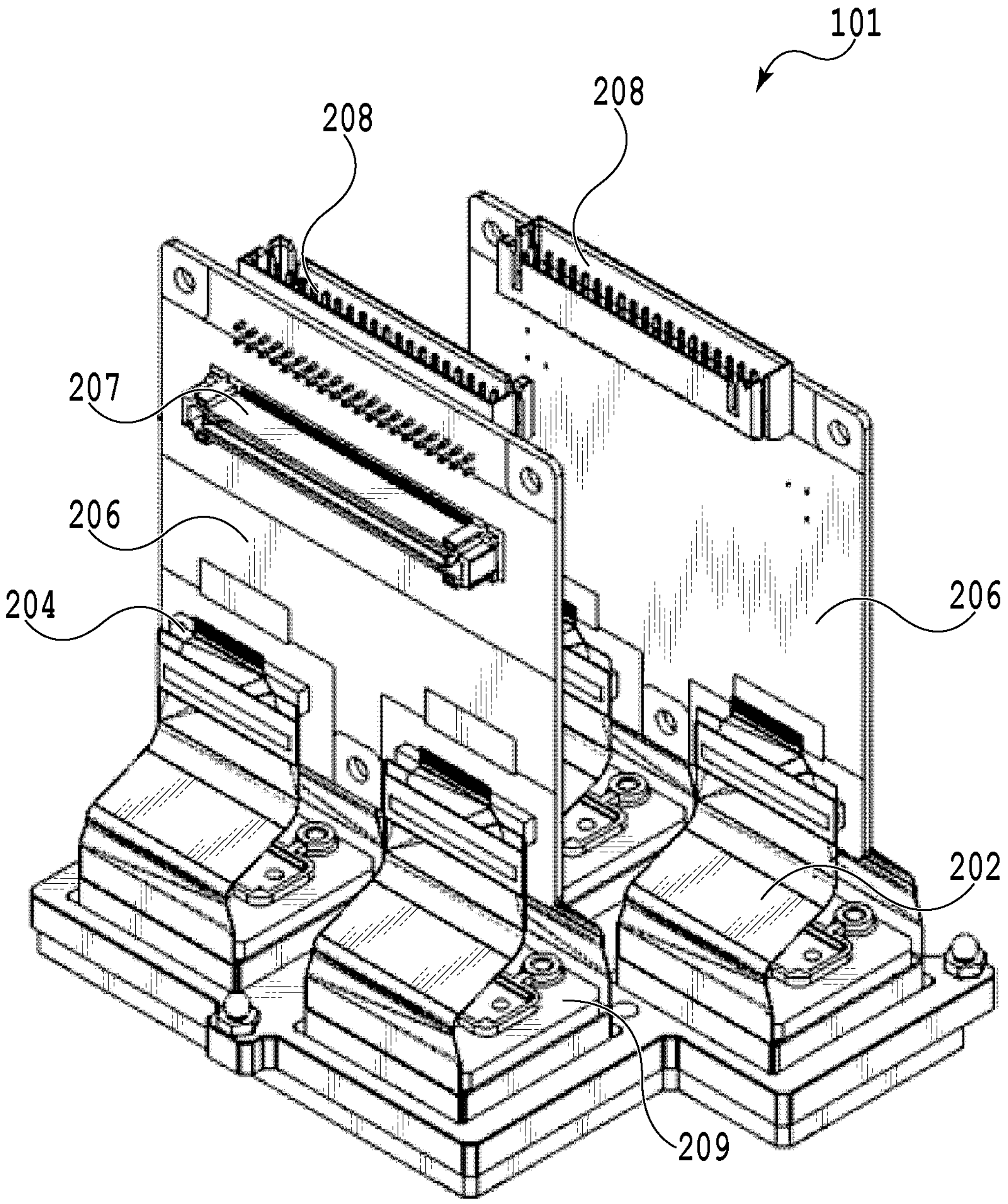
FIG. 3 is a perspective view illustrating the inkjet printing head.

FIG. 3 is a schematic view of the printing head 101. One head includes four chip units 209. The head substrate connection unit 204 makes an electric connection between each of the chip units 209 and a head substrate 206. The head substrate 206 includes a signal connection unit 207 and a driving signal connection unit 208 that are connected with the printing apparatus body.

Figure 4:
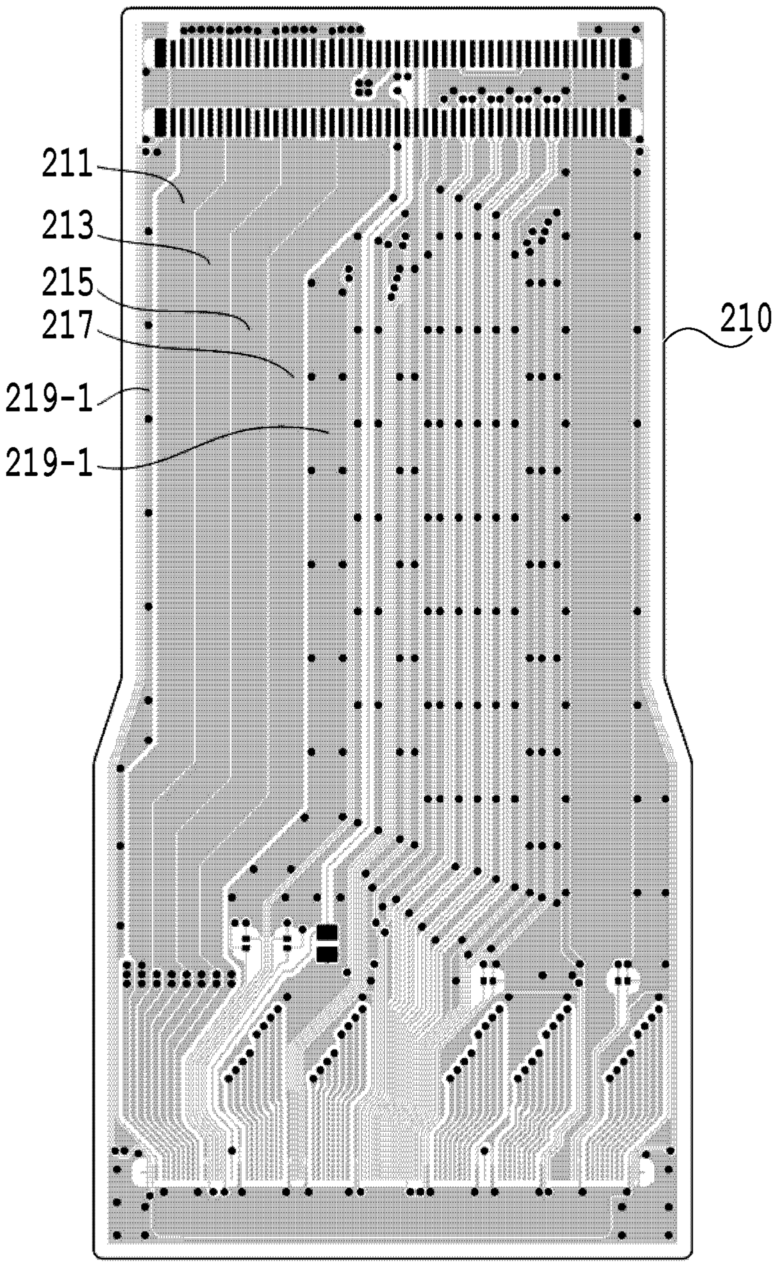
FIG. 4 is a schematic view illustrating a wiring line in the inkjet printing head.

FIG. 4 illustrates a wiring line of a first layer of a flexible electric wiring substrate 210 (corresponding to the flexible electric wiring substrate 202 in FIG. 3). Wiring lines of a first driving signal wiring line 211, a third driving signal wiring line 213, a fifth driving signal wiring line 215, and a seventh driving signal wiring line 217 have substantially the same wiring widths. A driving signal feedback current wiring line 219-1 is arranged on the opposite side to the third driving signal wiring line 213 with respect to the first driving signal wiring line 211. Additionally, the driving signal feedback current wiring line 219-1 is also arranged on the opposite side to the fifth driving signal wiring line 215 with respect to the seventh driving signal wiring line 217.

Figure 5:
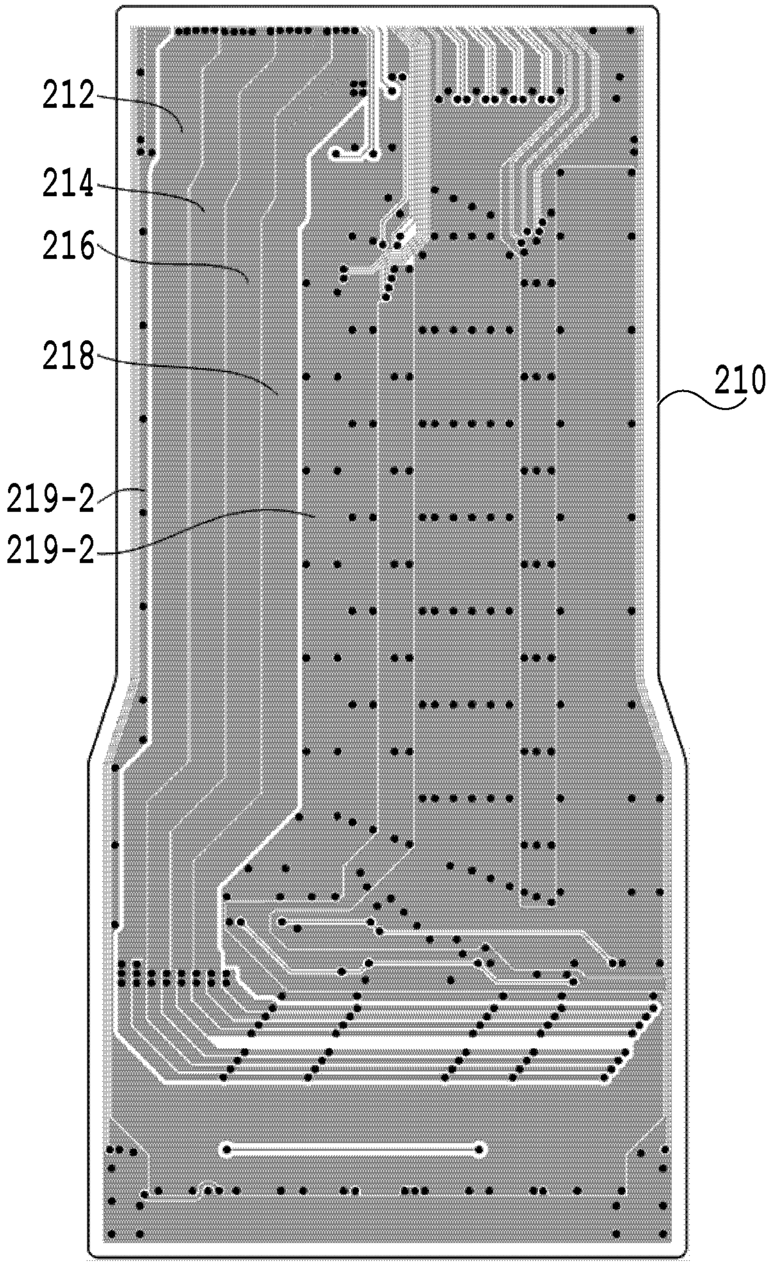
FIG. 5 is a schematic view illustrating a wiring line in the inkjet printing head.

FIG. 5 illustrates a wiring line of a second layer of the flexible electric wiring substrate 210. Wiring lines of a second driving signal wiring line 212, a fourth driving signal wiring line 214, a sixth driving signal wiring line 216, and an eighth driving signal wiring line 218 have substantially the same wiring widths. A driving signal feedback current wiring line 219-2 is arranged on the opposite side to the fourth driving signal wiring line 214 with respect to the second driving signal wiring line 212. Additionally, the driving signal feedback current wiring line 219-2 is arranged on the opposite side to the sixth driving signal wiring line 216 with respect to the eighth driving signal wiring line 218.

<Driving Method of Piezoelectric Element and Driving Signal of Piezoelectric Element>

Figure 6B:
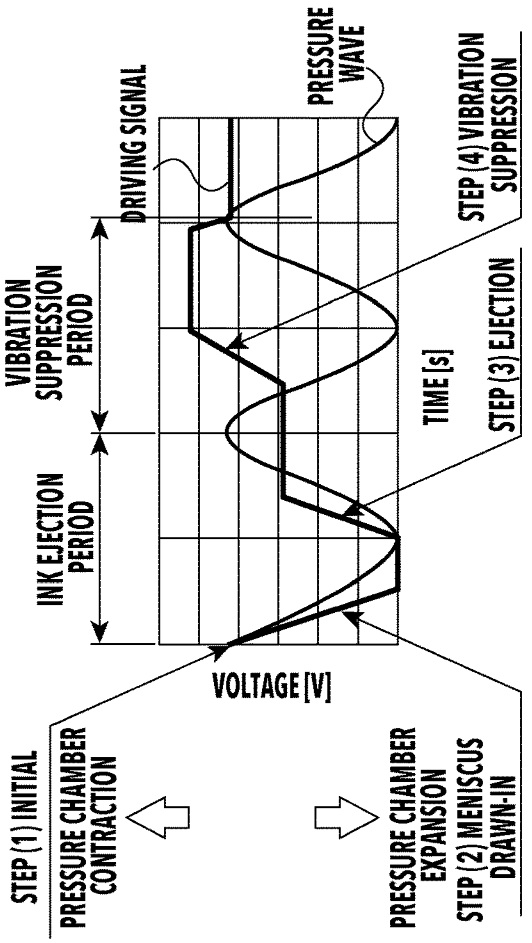
FIGS. 6A and 6B are diagrams illustrating a driving method of a piezoelectric element and a driving signal of the piezoelectric element.
Figure 6A:
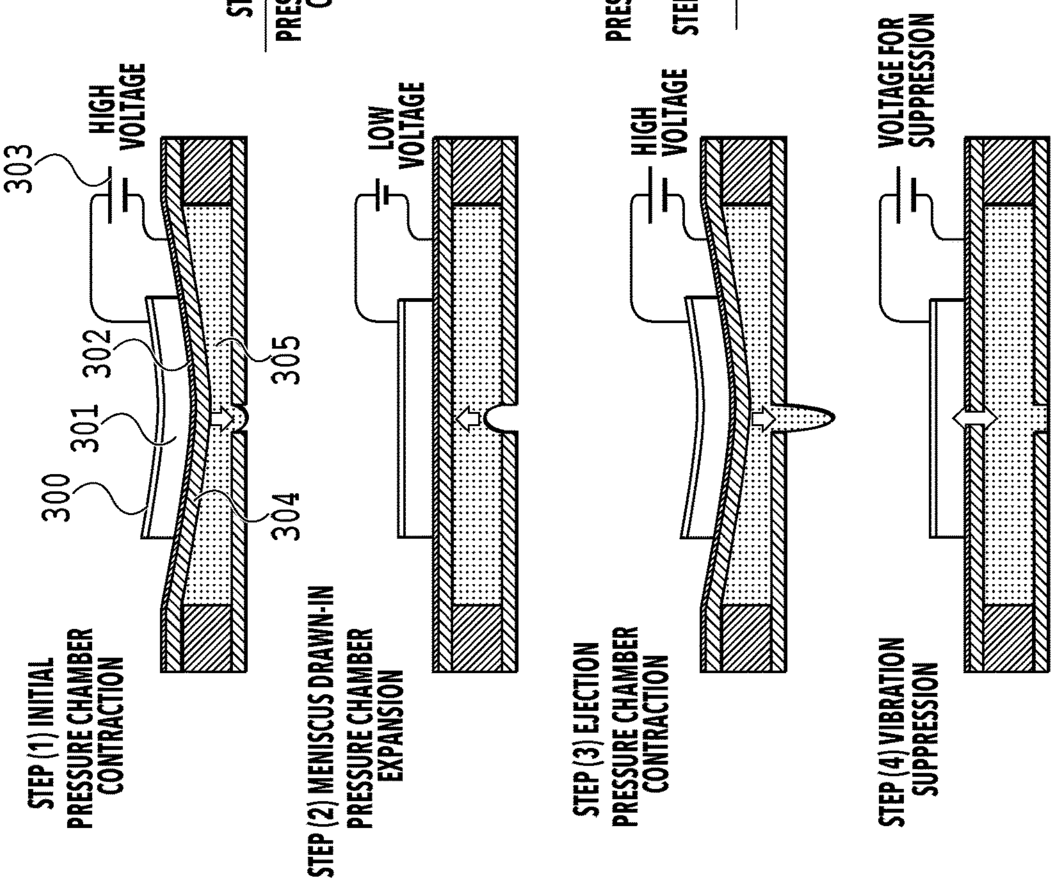

A driving method of a piezoelectric element 301 and a driving signal applied to the piezoelectric element 301 are described with reference to FIGS. 6A and 6B. Driving the piezoelectric element 301 requires the following four steps, which are steps (1) to (4), and the steps are described sequentially.

- step (1): In the initial state, a pressure chamber 304 is filled with ink 305, a high voltage is applied between an upper electrode 300 and a lower electrode 302 of the piezoelectric element 301 from a voltage source 303, and the pressure chamber 304 is contracted.
- step (2): The pressure chamber 304 is expanded by reducing the voltage from the voltage source 303, and the ink 305 is drawn into the expanded pressure chamber 304. In this process, a pressure wave in the form of a sine wave is generated in the pressure chamber 304 by the piezoelectric element 301.
- step (3): The pressure chamber 304 is contracted by raising the voltage from the voltage source 303 in synchronization with the pressure wave generated in step (2), and the ink 305 is ejected.
- step (4): After step (3), mechanical vibration continues in the piezoelectric element 301. The voltage from the voltage source 303 is raised again to dispel the mechanical vibration and stop the piezoelectric element 301.

A series of operations from the steps (1) to (4) described above is a single ejection operation. Additionally, a series of voltage changes in the voltage source 303 from the steps (1) to (4) is a waveform of the driving signal to be applied to the piezoelectric element 301.

<Configuration of Inkjet Printing Apparatus>

Figure 7:
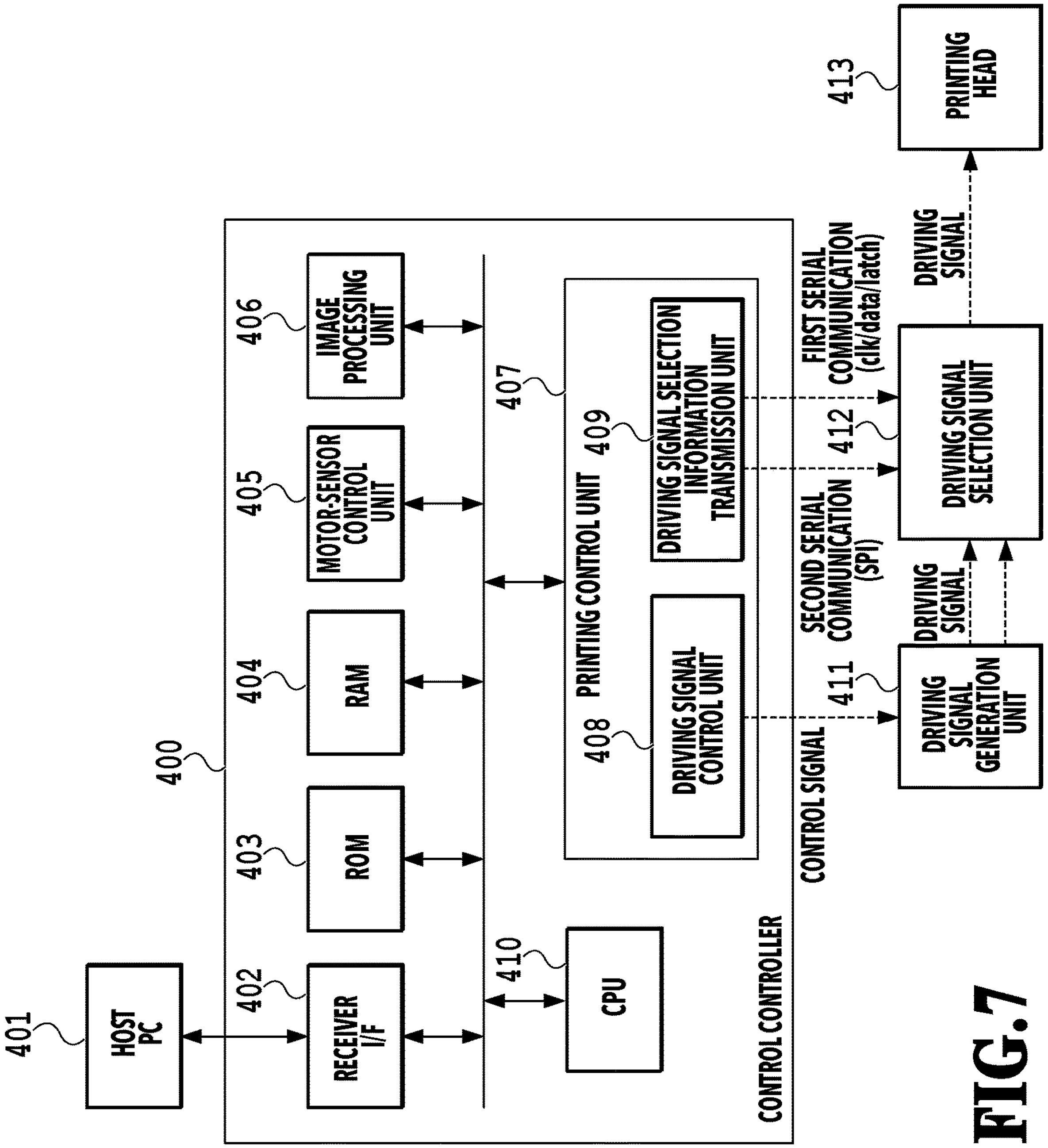
FIG. 7 is a block diagram illustrating a configuration of the inkjet printing apparatus.

A configuration of an inkjet printing apparatus is described. FIG. 7 is a block diagram illustrating the configuration of the inkjet printing apparatus. A Host PC 401 transmits a printing instruction and a printing job including image data for printing and printing setting information to a control controller 400. The control controller 400 that controls the inkjet printing apparatus includes a receiver I/F 402, a ROM 403, a RAM 404, a motor-sensor control unit 405, an image processing unit 406, a printing control unit 407, and a CPU 410.

The receiver I/F 402 transmits and receives data to and from the Host PC 401. The ROM 403 stores a program for operating the CPU 410. The RAM 404 is used to execute the program and temporarily stores various pieces of data. The motor-sensor control unit 405 controls a motor and a sensor in the inkjet printing apparatus. The image processing unit 406 performs image processing on the image data included in the printing job transmitted from the Host PC 401 through the receiver I/F 402. Specifically, for example, the image processing unit 406 generates raster image data in a bitmap format based on the image data that is included in the printing job received from the Host PC 401 and expressed in a page description language. Additionally, the image processing unit 406 converts the generated image data into image data of each ink color such as CMYK that is processable by the printing control unit 407 and outputs the image data. Based on the image data outputted by the image processing by the image processing unit 406, the printing control unit 407 performs printing control on a printing head 413 (corresponding to the printing head 101 in FIG. 1).

The printing control unit 407 includes a driving signal control unit 408 and a driving signal selection information transmission unit 409. The driving signal control unit 408 transmits a control signal for generating the driving signal to a driving signal generation unit 411. The driving signal selection information transmission unit 409 transmits driving signal selection information to a driving signal selection unit 412 (corresponding to the driving signal selection unit 201 in FIG. 2) by serial communication using a predetermined communication route (referred to as first serial communication). The serial communication indicates a communication method of continuously transmitting and receiving data by one bit by using one or two communication routes for transmitting and receiving data.

Based on the control signal transmitted from the driving signal control unit 408, the driving signal generation unit 411 outputs multiple driving signals to the driving signal selection unit 412. Note that, in the present embodiment, descriptions are given assuming that the multiple driving signals include three types of driving signals (large size ink droplet, small size ink droplet, and no ink droplet ejection), which are described later (see FIG. 11 and the like).

Based on the driving signal selection information transmitted by the driving signal selection information transmission unit 409, the driving signal selection unit 412 selects the driving signal from the multiple driving signals transmitted by the driving signal generation unit 411. The driving signal selected by the driving signal selection unit 412 is inputted to the piezoelectric element 301 corresponding to the nozzle in the printing head unit. Once a voltage of the driving signal waveform is applied to the electrodes of the piezoelectric element 301, the piezoelectric element 301 between the electrodes is displaced, and the energy accordingly generated is used to eject the ink from the nozzle.

With the above-described first serial communication, the driving signal selection information transmission unit 409 and the driving signal selection unit 412 are connected to each other, and a clk signal, a data signal, and a latch signal are transmitted. Specifically, the information is transmitted with the data signal in synchronization with clk, and the information is transmitted by the unit of the latch signal.

With second serial communication using a communication route different from that used in the first serial communication, the driving signal selection information transmission unit 409 and the driving signal selection unit 412 are connected to each other. The second serial communication is used to make setting inside the driving signal selection unit 412. Note that, in the present example, a communication protocol such as the commonly and widely known serial peripheral interface (SPI) is used as the second serial communication; however, the communication method is not limited thereto.

The printing head 413 includes the nozzle (also referred to as an ejection hole) with the mechanism of ejecting the ink and the piezoelectric element 301 corresponding to the nozzle, and the printing head 413 ejects the ink by inputting the driving signal to the piezoelectric element 301 corresponding to the nozzle. Note that, unless otherwise stated, the printing head 413 including 128 nozzles and the piezoelectric element 301 corresponding to each of the nozzles is described below as an example; however, the number of the nozzles may be anything as long as it is an integer of 2 or greater.

Figure 8:
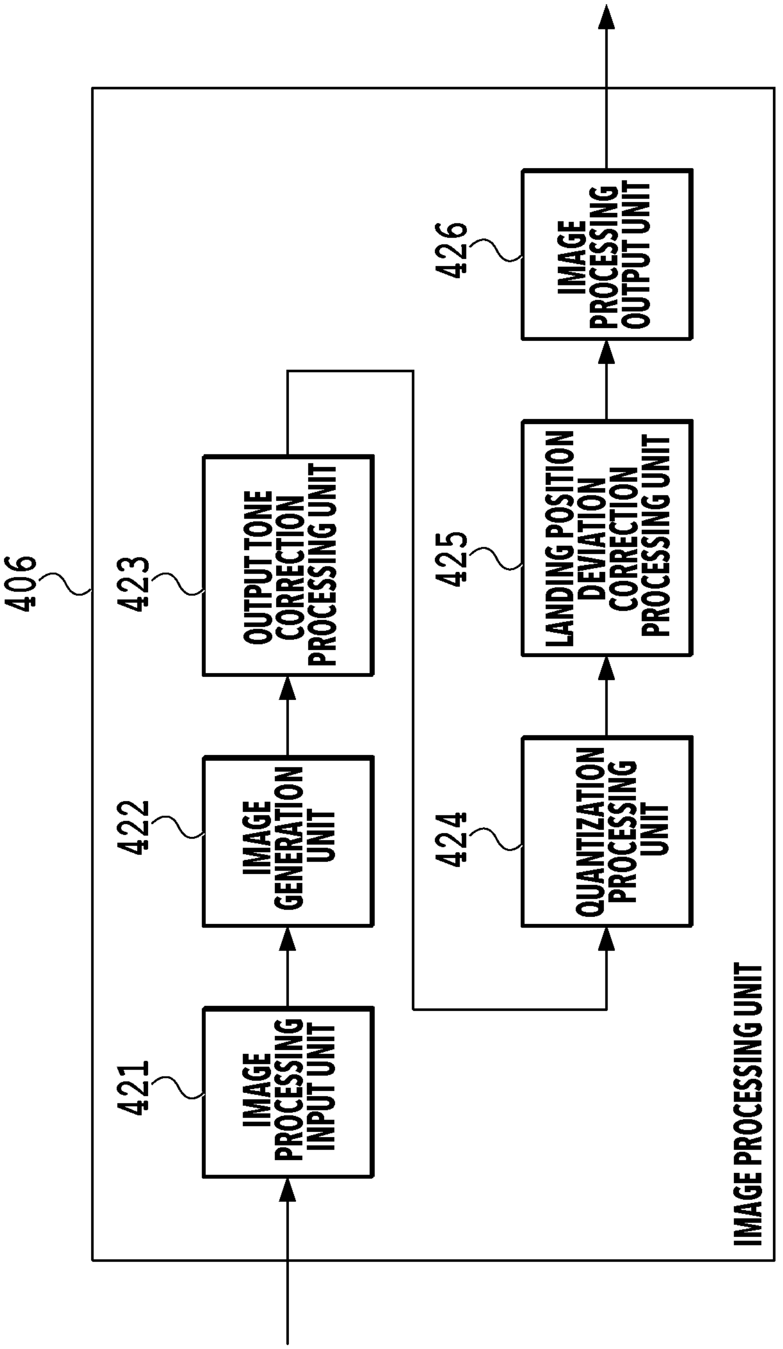
FIG. 8 is a block diagram illustrating a configuration of an image processing unit.

FIG. 8 is a block diagram illustrating a detailed structure of the image processing unit 406 in FIG. 7. An instruction from the CPU 410 to the image processing unit 406 is made by writing an appropriate value into a not-illustrated register unit.

An image processing input unit 421 takes in the image data included in the printing job from the RAM 404 based on the instruction of the CPU 410 and outputs the image data to an image generation unit 422. The image generation unit 422 converts the received image data into image data of CMYK4 channels with a resolution printable by the printing head 413 and outputs the image data to an output tone correction processing unit 423. The output tone correction processing unit 423 performs correction processing corresponding to the ink output characteristics. A quantization processing unit 424 performs processing of converting data of 8-bit to 16-bit tone into data of a tone expressible by the nozzle of the printing head. Commonly, the image data is converted into N-value by using the error diffusion method, the dithering method, or the like, and the tone is converted into image data of 1-bit to 4-bit. A landing position deviation correction processing unit 425 displaces the data by the unit of pixel so as to correct the landing position deviation of each nozzle by the unit of image resolution. An image processing output unit 426 performs processing of outputting the image data subjected to the above image processing to the RAM 404, and the image data is stored in the RAM 404.

<Driving Signal Selection Unit>

The driving signal selection unit 412 illustrated in FIG. 7 is described with reference to FIGS. 9A and 9B. The data transmitted from the driving signal selection information transmission unit 409 through the first serial communication is received by a serial-parallel conversion unit 506 and held by a data latch 507 from the input timing of the latch signal. The held driving signal selection information is inputted to a decoder 509.

The driving signal generation unit 411 includes multiple digital-analog conversion units 512 and multiple driving signal generation circuits 513. Each digital-analog conversion unit 512 receives the control signal from the driving signal control unit 408. Each driving signal generation circuit 513 that receives an analog signal outputted by the digital-analog conversion unit 512 generates the driving signal.

The generated driving signal is inputted to a switch group 510 in the driving signal selection unit 412. The switch group 510 includes multiple switches SWx-y (x corresponds to a nozzle number identifying the nozzle, and y corresponds to a driving signal number identifying the driving signal). Based on decoding information of the decoder 509, the switch group 510 selects the driving signal from the multiple driving signals and drives the piezoelectric element 301 corresponding to the nozzle. In the present example, as described above, the printing head 413 includes a nozzle group 503 including 128 nozzles and the piezoelectric element 301 corresponding to each nozzle, and the number of each of the decoders 509 and the switch groups 510 is the same as the number of the nozzles.

<First Serial Communication>

Figure 10:
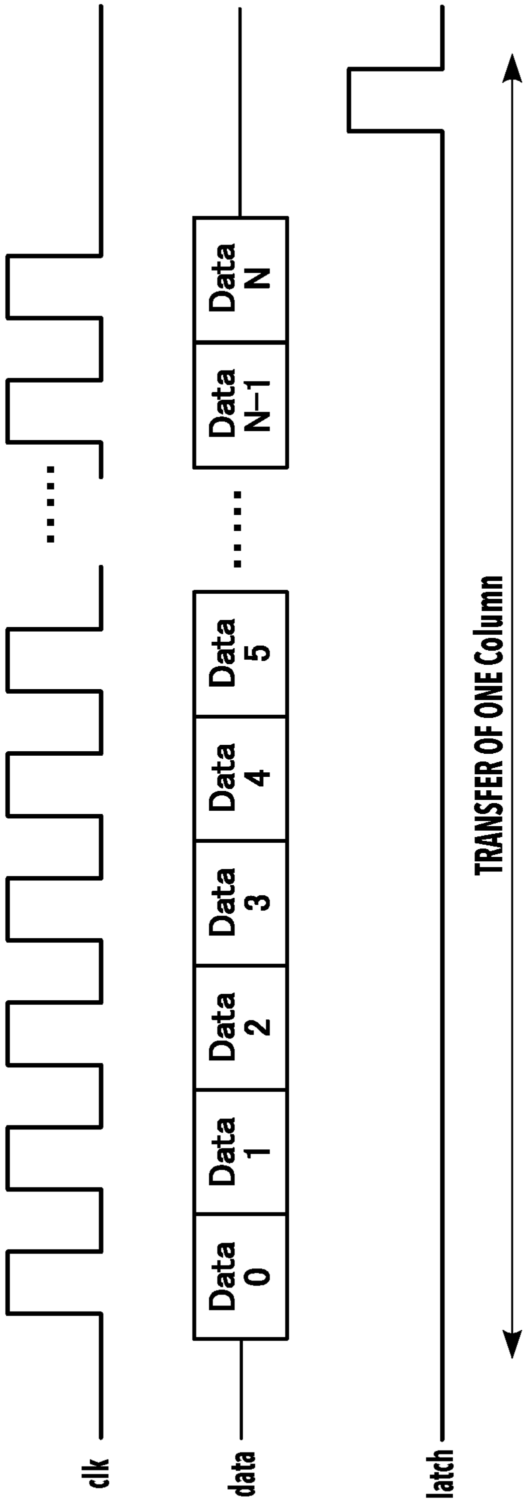
FIG. 10 is a diagram illustrating first serial communication.

FIG. 10 illustrates the contents of the signals transmitted from the driving signal selection information transmission unit 409 through the first serial communication. As illustrated in FIG. 10, the data signal is transmitted with synchronization with the clk signal. The latch signal indicates the end of single transmission.

The number of the data signal does not have to be one and may be increased taking into consideration the balance with the frequency of the clk signal so as to perform ejection at a predetermined ink ejection frequency. Note that, the "ink ejection frequency" indicates the number of times of ejecting an ink droplet per second by the printing head.

In the present disclosure, data of one Column, specifically, data of the nozzle number×the driving signal selection information (in other words, the number of types of the driving signals) are communicated so as to be transmittable between one latch signal and the next latch signal. For example, in a case where there are four types of the driving signals and the nozzle number is 128, data of 128×2-bit (meaning selection from the four types of signals) is transmitted between the latch signals. On the other hand, in a case where there is a switch for residual vibration detection in addition to the four types of driving signals (described later in detail), the sum of the type number of the driving signals and the number of the switches for residual detection is 5 (=4+1). Accordingly, data of 128×3-bit (for selection from the five states) has to be transmitted between the latch signals.

<Timing Chart of Driving Signal Selection Unit>

Figure 11:
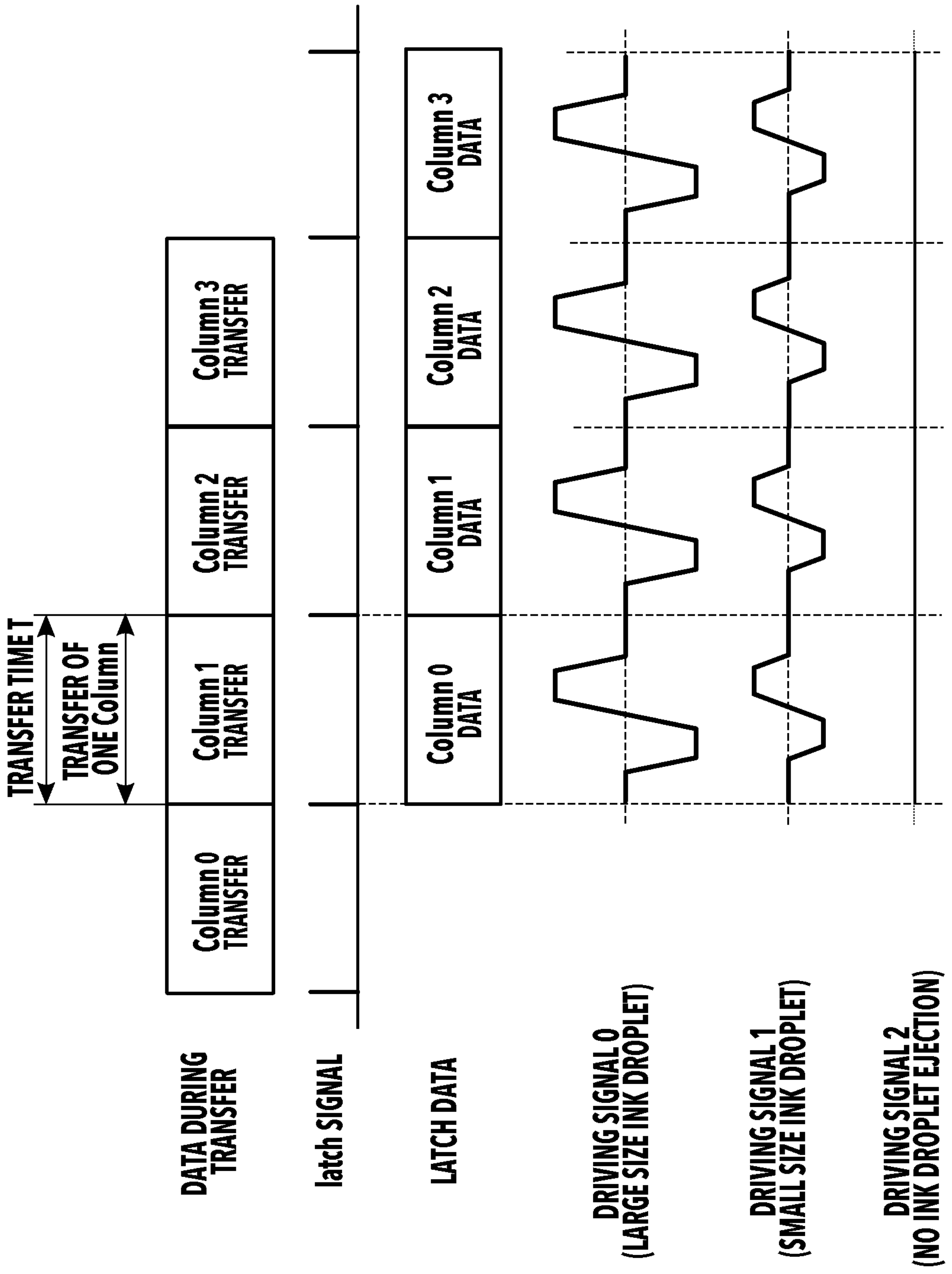
FIG. 11 is a timing chart of the driving signal selection unit.

A timing chart of the driving signal selection unit is described with reference to FIG. 11. FIG. 11 illustrates a relationship between the data transmitted through the first serial communication and the driving signal. The driving signal selection information of one Column is transferred between one latch signal and the next latch signal, and the received data is held in the data latch 507 (see FIGS. 9A and 9B) from the reception of the latch signal. Based on the data held in the data latch 507, one type out of the plurality of types of driving signals is selected for each nozzle and transmitted to the piezoelectric element 301 corresponding to each nozzle. For example, three types of the driving signals are assumed in a case of FIG. 11. Accordingly, in this case, there are three driving signal generation circuits (513-0, 513-1, and 513-2) in FIGS. 9A and 9B. The driving signals that can implement a desired ink droplet state such as the large size ink droplet, the small size ink droplet, and the no ink droplet ejection are allocated and used for the three driving signal generation circuits 513. Note that, as illustrated in FIG. 11, the driving signal for implementing the state of the large size ink droplet is defined as a "driving signal 0", the driving signal for implementing the state of the small size ink droplet is defined as a "driving signal 1", and the driving signal for implementing the state of the no ink droplet ejection is defined as a "driving signal 2".

<Residual Vibration Detection Circuit>

Figure 9B:
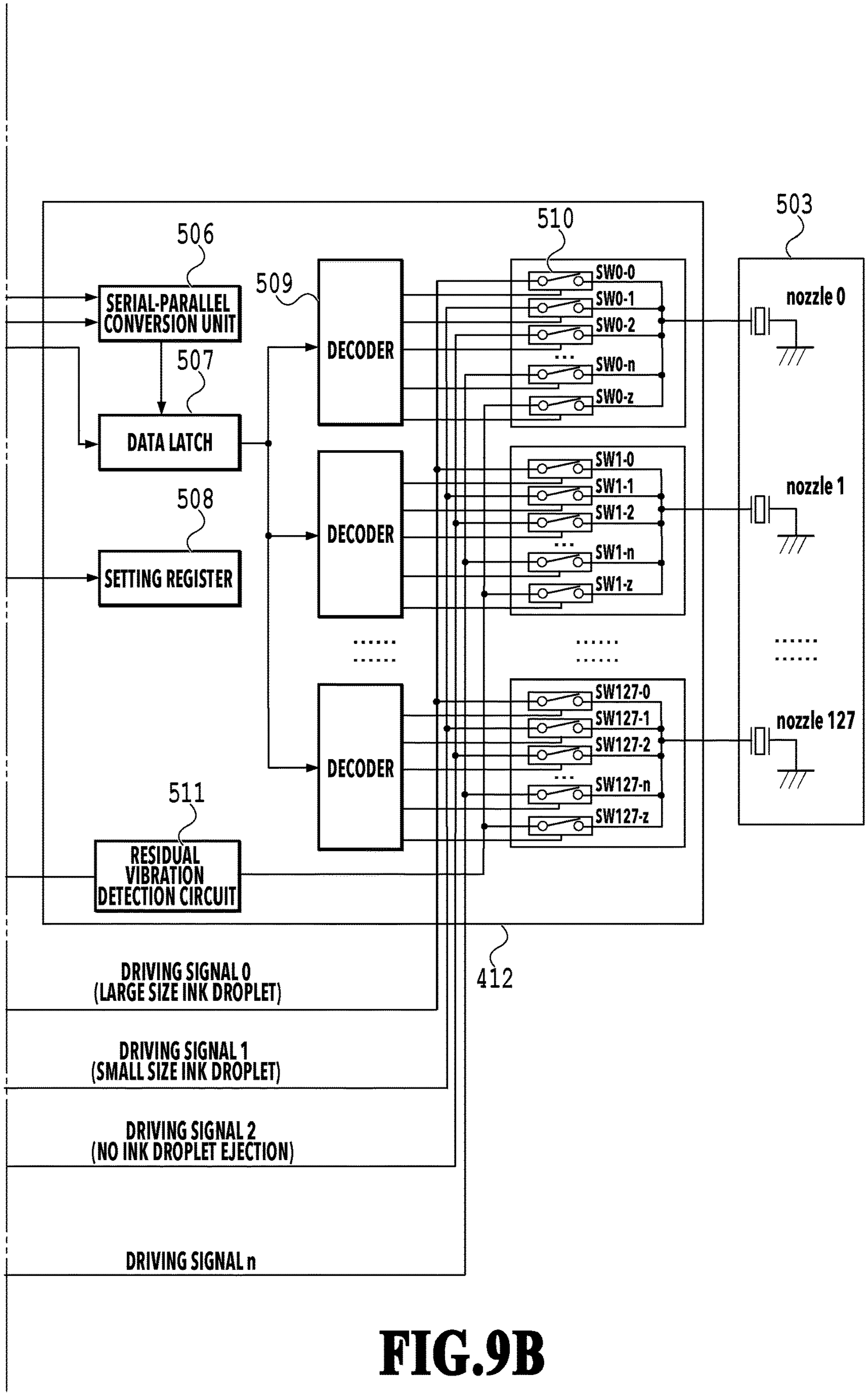

Among the switches included in the switch group 510 illustrated in FIGS. 9A and 9B, switches SWx-0 to SWx-n (in the present example, x and n are each one value of integers of a range from 0 or greater to 127 or smaller) are switches for applying the driving signal to the piezoelectric element 301 corresponding to the nozzle x.

On the other hand, a switch SWx-z (in the present example, x is one value of integers of a range from 0 or greater to 127 or smaller) is a switch for supplying a residual vibration voltage, which is generated in the piezoelectric element 301 due to the residual vibration after the piezoelectric element 301 is driven, to a residual vibration detection circuit 511.

Figure 12:
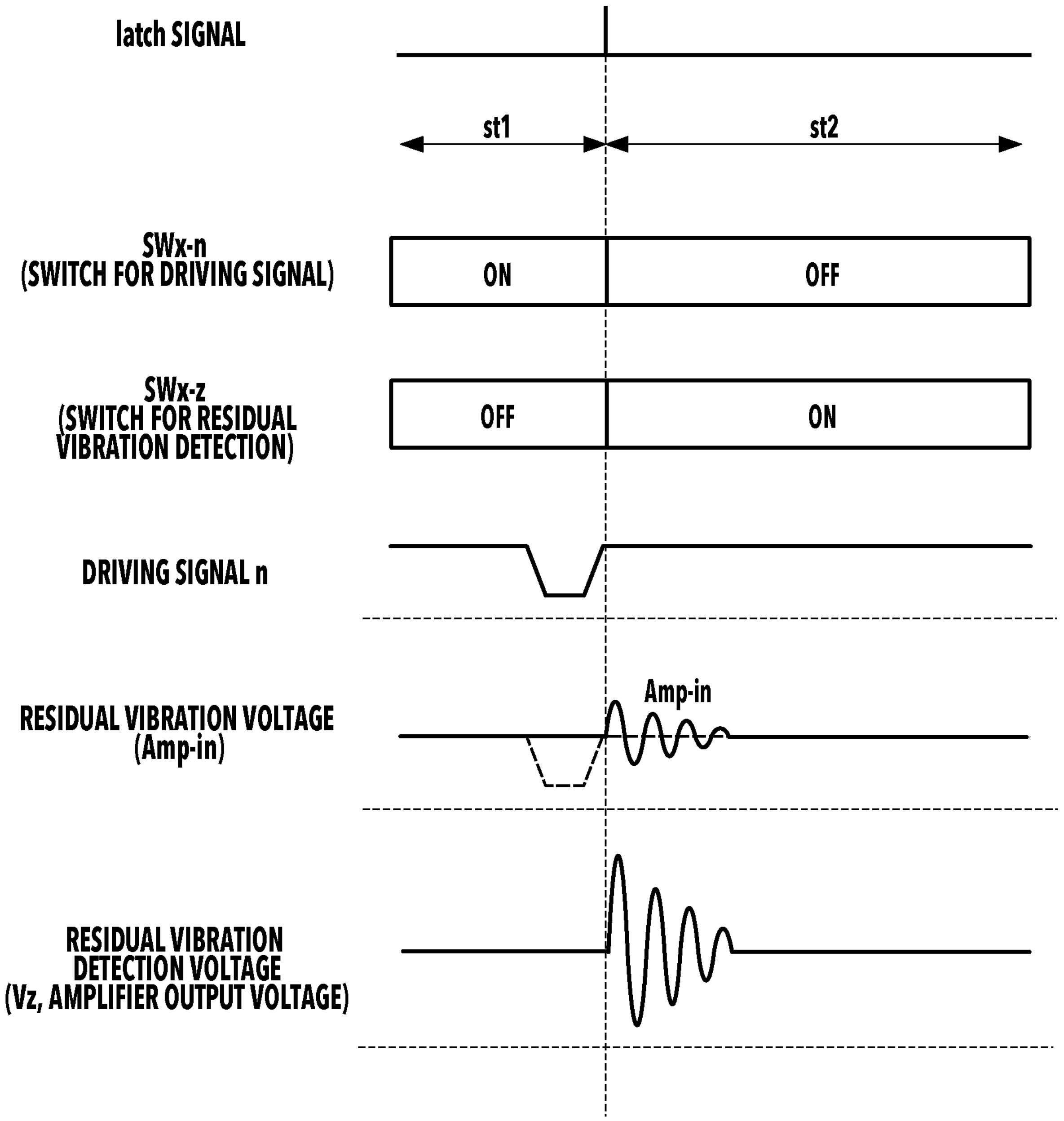
FIG. 12 is a diagram illustrating a residual vibration voltage.

As illustrated in FIG. 12, first, the driving signal is applied to the piezoelectric element 301 to drive the piezoelectric element 301 in a section st1. Thereafter, the switch is turned off, and the application of the driving signal to the piezoelectric element 301 is stopped. Then, a voltage Amp-in appears in the piezoelectric element 301 in a section st2 as illustrated in FIG. 12. This voltage is a voltage converted from the mechanical vibration remaining in the piezoelectric element 301 by a piezoelectric effect and is called the "residual vibration voltage". It is possible to detect abnormality in each nozzle by detecting and analyzing the residual vibration voltage.

Figure 13:
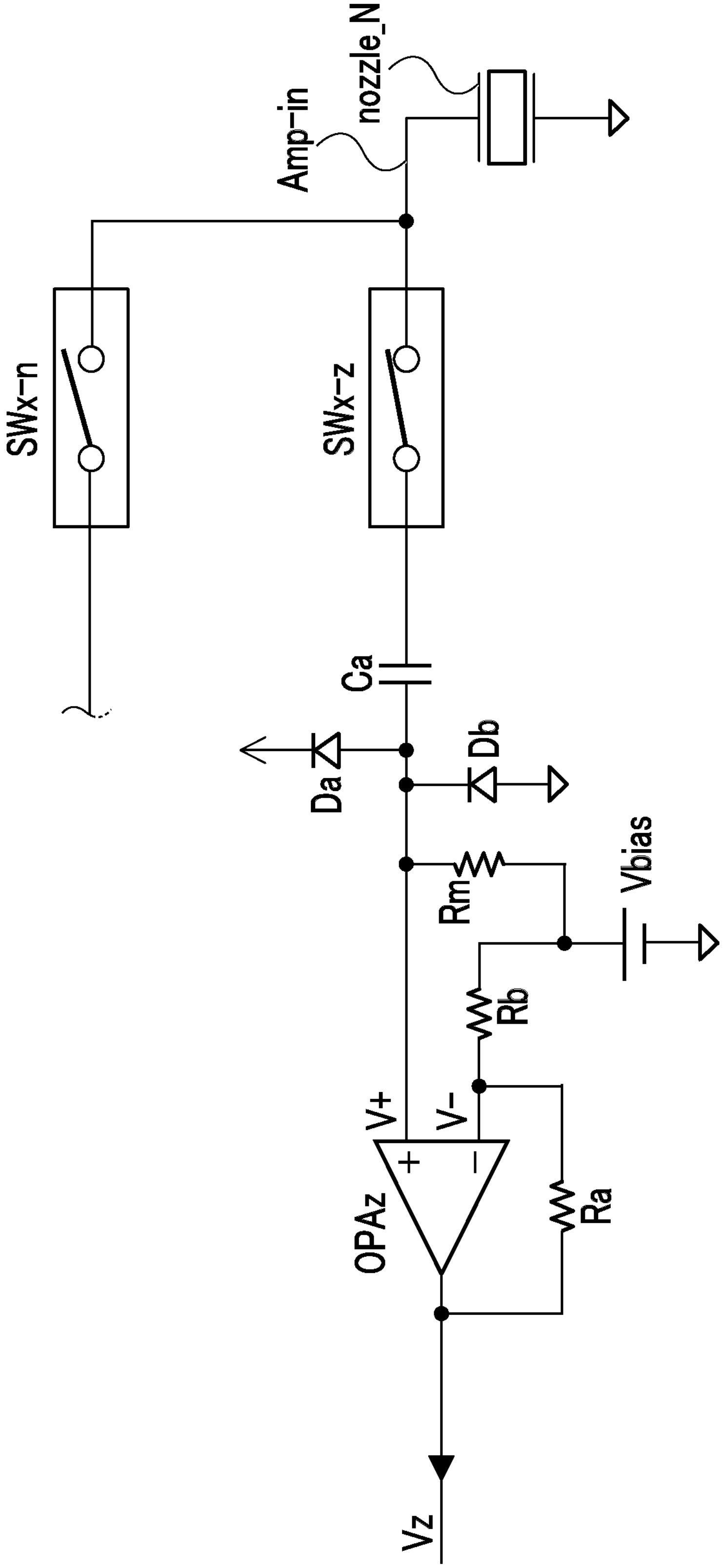
FIG. 13 is a diagram illustrating a residual vibration detection circuit.

The detection of the residual vibration executed by the residual vibration detection circuit 511 in FIGS. 9A and 9B is described with reference to FIG. 13.

The residual vibration voltage Amp-in is supplied to a non-inverting input terminal V+ of an operational amplifier OPAz through the switch SWx-z and a capacitor Ca. Additionally, the non-inverting input terminal V+ of the operational amplifier OPAz is connected to a bias voltage Vbias through a resistance Rm. On the other hand, an inverting input terminal V− of the operational amplifier OPAz is connected to the bias voltage Vbias through the resistance Rb. Additionally, the inverting input terminal V− of the operational amplifier OPAz is connected to an output terminal of the operational amplifier OPAz through a resistance Ra.

In the above-described circuit, the residual vibration voltage Amp-in is amplified to a residual vibration detection voltage Vz. The residual vibration detection voltage Vz is expressed by formula (1):

[Mathematical 1]

$$Vz = \frac{R_a + R_b}{R_b} \cdot \mathrm{Amp}_{-in} + V_{bias} \qquad \text{Formula (1)}$$

The residual vibration detection voltage Vz is transmitted to the outside of the residual vibration detection circuit 511. Thereafter, the residual vibration detection voltage Vz is converted into a digital signal by a not-illustrated analog-digital conversion device and analyzed by a not-illustrated logical operation element.

<Driving Signal Generation Circuit>

Figure 14:
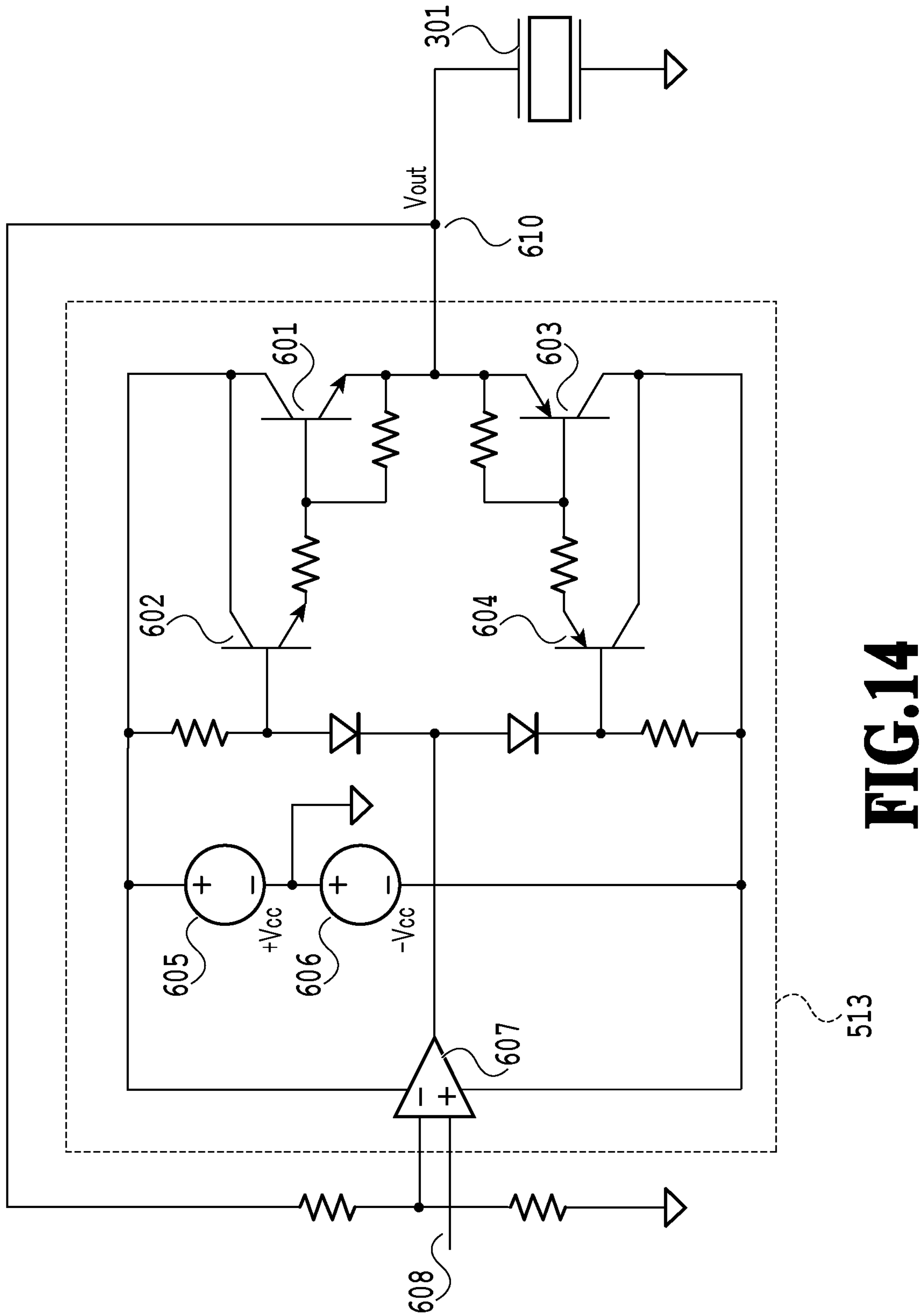
FIG. 14 is a diagram illustrating a driving signal generation circuit for ink ejection.

The driving signal generation circuit 513 illustrated in FIGS. 9A and 9B is described with reference to FIG. 14. FIG. 14 is a circuit diagram of the driving signal generation circuit 513. The driving signal generation circuit 513 is a so-called amplifier circuit and amplifies a voltage and a current of an analog signal 608 supplied to a non-inverting input terminal V+ of an operational amplifier 607.

As illustrated in FIG. 14, the driving signal generation circuit 513 includes a transistor 601 and a transistor 602 that are Darlington-connected to each other on a high side, a transistor 603 and a transistor 604 that are Darlington-connected to each other on a low side, and the operational amplifier 607. Each of the transistor 601 and the transistor 602 is an npn transistor, and each of the transistor 603 and the transistor 604 is a pnp transistor.

A base terminal of the transistor 602 and a base terminal of the transistor 604 are each connected to an output terminal of the operational amplifier 607 through a diode. An emitter terminal of the transistor 601 and an emitter terminal of the transistor 603 are each connected to the piezoelectric element 301 through the not-illustrated switch SWx-n.

In the above-described configuration, once the analog signal 608 is inputted to the driving signal generation circuit 513, the voltage of the analog signal 608 is amplified in the operational amplifier 607. Next, the transistor 601 and the transistor 602 and the transistor 603 and the transistor 604 amplify the current.

Eventually, the piezoelectric element 301 is driven by a driving signal 610 with the voltage and the current both amplified, thereby ejecting the ink.

First Embodiment

A first embodiment is described below with reference to FIGS. 15 to 25.

Figure 15:
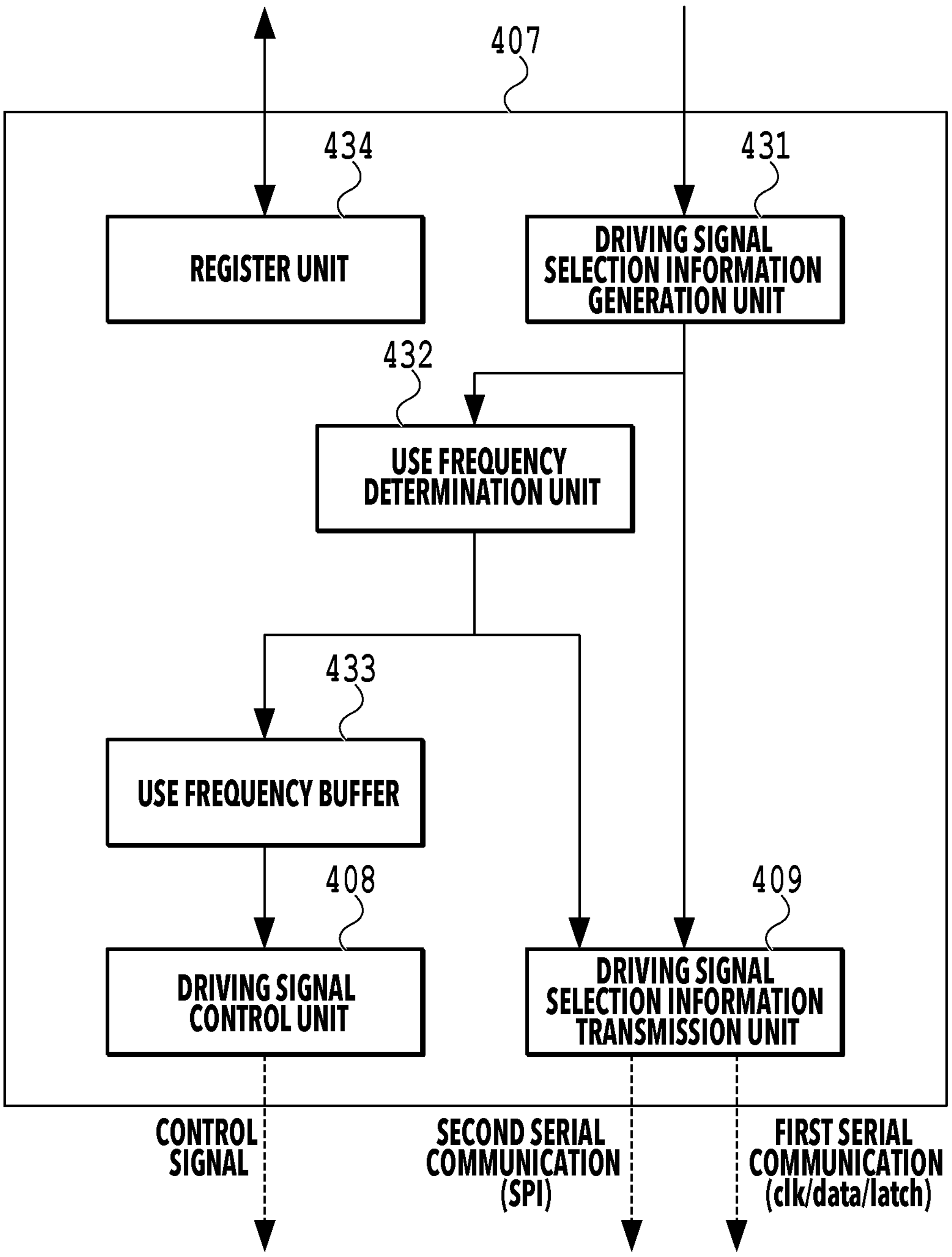
FIG. 15 is a diagram describing a printing control unit.

FIG. 15 is a block diagram illustrating a configuration of the printing control unit 407 (see FIG. 7) in the present embodiment.

The instruction from the CPU 410 to the printing control unit 407 is made by writing an appropriate value into a register unit 434.

A driving signal selection information generation unit 431 reads the image data from the RAM 404, and the driving signal selection information indicating which driving waveform is selected for each pixel included in the image is outputted to the driving signal selection information transmission unit 409 and a use frequency determination unit 432. In the present embodiment, the value of each pixel of the image data is directly used as the value of the driving signal selection information; however, different values for each nozzle may be used as the value of the driving signal selection information in accordance with the ejection characteristics of each nozzle instructed by the CPU 410. In the present embodiment, data of each pixel of the driving signal selection information is any one of three values, which are "0" indicating that a driving signal of non-ejection is selected, "1" indicating that a driving signal of the large size ink droplet is selected, and "2" indicating that a driving signal of the small size ink droplet is selected.

The use frequency determination unit 432 performs use frequency information generation processing to determine a use frequency of the driving signal selection information on the data inputted from the driving signal selection information generation unit 431 for each data of a Column. Note that, the "Column" indicates the unit of driving for collective processing in single processing, and in the present example, one Column is one line of nozzles arrayed in a sub-scanning direction in the printing head. Note that, the use frequency information generation processing is described later with reference to FIG. 16.

Use frequency information PriTab is table data indicating the order of the use frequencies of the values of the driving signal selection information and is expressed as {a, b, c} in the present example employing the three values as the driving signal selection information. a is the rank of the use frequency corresponding to "0", b is the rank of the use frequency corresponding to "1", and c is the rank of the use frequency corresponding to "2". Note that, in the present embodiment, the values of the ranks of the use frequencies are expressed by 0 to 2.

For example, here is considered a case where "0" is used most frequently, "1" is used most frequently next to "0", and "2" is used less frequently than "1" (used least frequently among the three values) in the driving signal selection information corresponding to one Column. In this case, the use frequency information PriTab is {0, 1, 2}.

Additionally, for example, here is considered a case where "2" is used most frequently, "0" is used most frequently next to "2", and "1" is used less frequently than "0" (used least frequently among the three values) in the driving signal selection information corresponding to another Column. In this case, the use frequency information PriTab is {1, 2, 0}.

The driving signal selection information transmission unit 409 performs replacement processing to replace the values of the driving signal selection information outputted from the driving signal selection information generation unit 431 based on the use frequency information outputted from the use frequency determination unit 432. The replacement processing is processing of converting (the values of) the driving signal selection information into predetermined values in descending order of the use frequency. As an example of the replacement processing in the present embodiment, formula (2) in a case where the driving signal selection information of one pixel is InDat[i], and the driving signal selection information of the pixel after the replacement processing is OutDat[i] is expressed as follow:

$$\text{OutDat}[i]=\text{PriTab}[\text{InDat}[i]]\ (i\text{: 0 to 127}) \qquad \text{Formula (2).}$$

Note that, here are 128 nozzles for per Column (one line), and i is an arbitrary value out of 0 to 127.

For example, in a case where the use frequency information PriTab={1, 2, 0} and the value of one pixel is "2" in the driving signal selection information, the driving signal selection information after the replacement processing by the replacement processing using formula (2) is "0". Likewise, in a case where the value of one pixel is "0" in the driving signal selection information, the driving signal selection information after the replacement processing is "1", and in a case where the value of one pixel is "1", the driving signal selection information after the replacement processing is "2". Thus, the value of the driving signal selection information is converted into the value of the rank of the use frequency by the replacement in the present embodiment. The driving signal selection information transmission unit 409 transmits the driving signal selection information subjected to the replacement processing to the driving signal selection unit 412 through the first serial communication.

A use frequency buffer 433 temporarily buffers the use frequency information and outputs the use frequency information to the driving signal control unit 408. In the present embodiment, the timing that the driving signal control unit 408 uses the use frequency information is after the driving signal selection unit 412 once latches the driving signal selection information. Accordingly, the use frequency buffer 433 performs an operation of buffering the use frequency information so as to stagger the operation by one latch signal.

Based on the use frequency information outputted from the use frequency determination unit 432, the driving signal control unit 408 selects which of the driving signals indicating the waveform the driving signal generation unit 411 generates for which wiring line of the flexible electric wiring substrate 202. The driving signal control unit 408 then transmits the control signal based on the selection to the driving signal generation unit 411. The multiple driving waveforms generated by the driving signal generation unit 411 based on the control of the driving signal control unit 408 are inputted to the driving signal selection unit 412 through the multiple driving signal wiring lines included in the flexible electric wiring substrate 202 as described with reference to FIGS. 9A and 9B. Here, the multiple driving signal wiring lines in the flexible electric wiring substrate 202 in the present embodiment have different wiring widths from each other. As the above-described driving signal wiring lines, first, there is a driving signal wiring line having a wiring width that can correspond to a driving current at the time of simultaneously driving all the piezoelectric elements (at the time of 100% driving) (in other words, that can flow such a current). Note that, in the present specification, as described above, as the description of the timing to simultaneously drive all the piezoelectric elements as "at the time of 100% driving", for example, a case of simultaneously driving a predetermined ratio n % of the piezoelectric elements is described as "at the time of n % driving".

Additionally, in the present embodiment, a driving signal wiring line that can correspond to the driving current at the time of 75% driving, a driving signal wiring line that can correspond to the driving current at the time of 50% driving, a driving signal wiring line that can correspond to the driving current at the time of 33% driving, and the like are also arranged, and the wiring width of each wiring line is narrow in proportion to the ratio. An operation of the driving signal control unit 408 is described later with reference to FIGS. 18 and 19A to 19C.

<Use Frequency Information Generation Processing>

Figure 16:
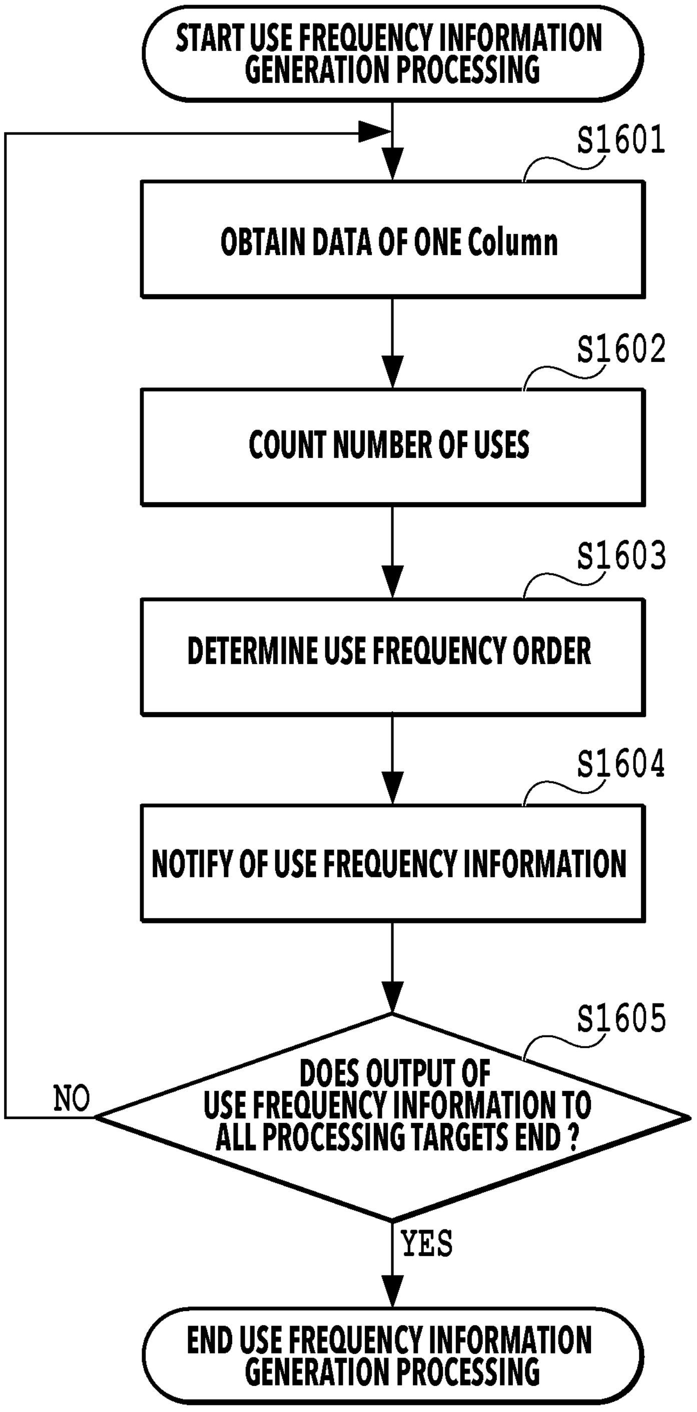
FIG. 16 is a flowchart of use frequency information generation processing.
Figure 17:
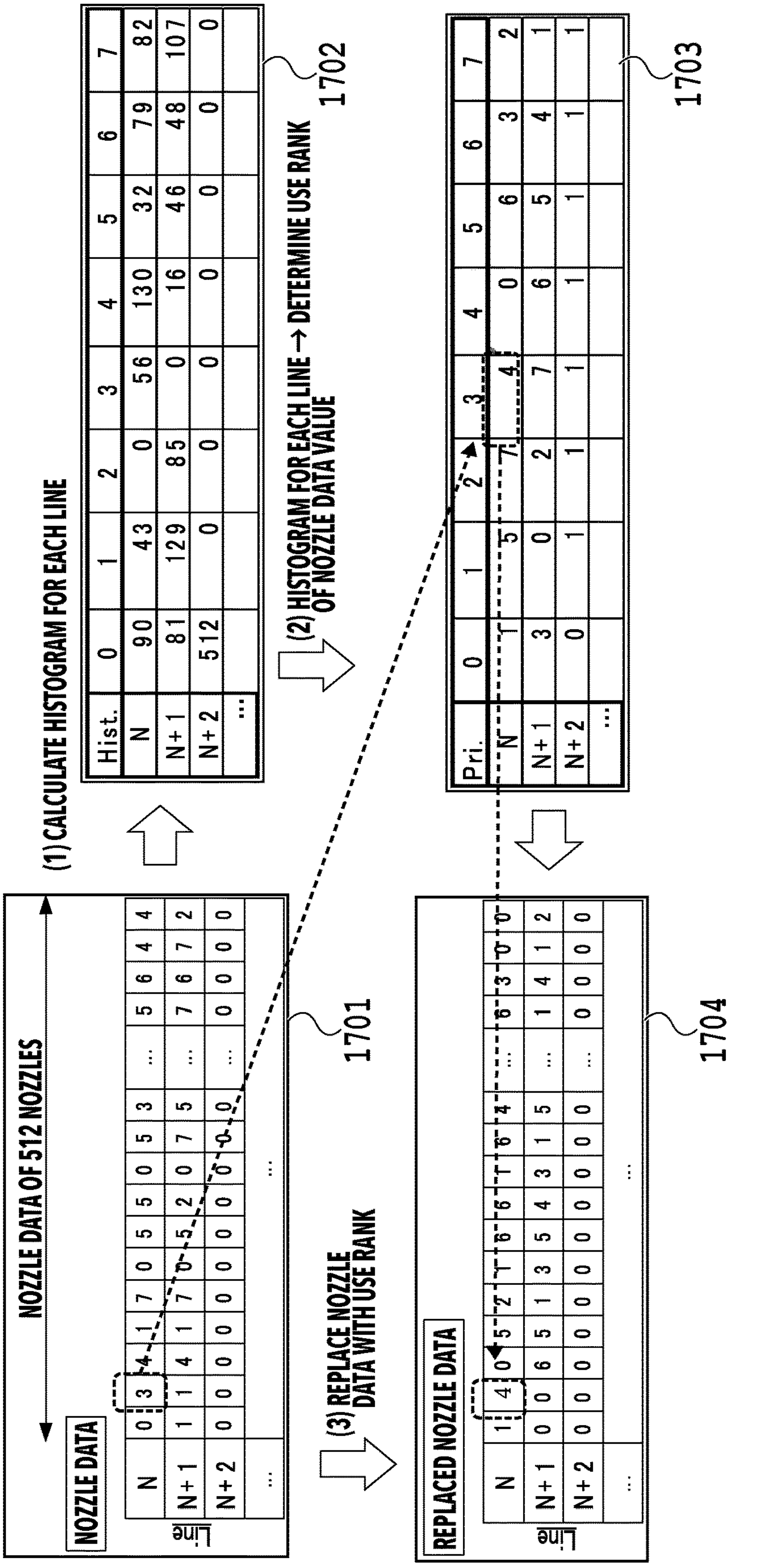
FIG. 17 is a diagram describing a specific example of the use frequency information generation processing.

The use frequency information generation processing in the present embodiment is described below with reference to FIG. 16. FIG. 16 is a flowchart of the processing performed by the use frequency determination unit 432 based on the instruction of the CPU 410.

In step S1601, the use frequency determination unit 432 obtains the unprocessed driving signal selection information of one Column out of the data as a processing target. Note that, here, "of one Column" is described as "of one nozzle line in the printing head". Hereinafter, for the sake of simplification, "step S" is abbreviated to "S".

In S1602, the use frequency determination unit 432 analyzes the data of each pixel included in the driving signal selection information obtained in S1601 and performs processing of counting which of the values that can be obtained as the values of the driving signal selection information is how much used (referred to as count processing). Note that, in the present embodiment, as described above, any one of the three values, which are "0" indicating that the driving signal of non-ejection is selected, "1" indicating that the driving signal of the large size ink droplet is selected, and "2" indicating that the driving signal of the small size ink droplet is selected, can be obtained. Accordingly, a count value of each of "0", "1", and "2" (that is, the number of uses of each value for each line) is obtained.

In S1603, the use frequency determination unit 432 determines the use frequency order (rank), assuming that the use frequency is high in descending order of the count value, by using the count value of each of the values of the driving signal selection information that can be obtained, which is derived in S1602.

In S1604, the use frequency determination unit 432 outputs the information on the use frequency order that is determined in S1603 (referred to as use frequency information). The use frequency information outputted by the use frequency determination unit 432 is received by the driving signal selection information transmission unit 409 and the use frequency buffer 433, and once the reception is confirmed, the processing proceeds to step S1605.

In S1605, the use frequency determination unit 432 determines whether the output of the use frequency information in S1604 ends for all the data that should be processed. For example, the determination result of the present step may be true if the output of the information in S1604 for one page of image data ends. If the determination result of the present step is true, the series of processing ends. On the other hand, if the determination result is false, the processing returns to S1601.

<<Another Specific Example of Use Frequency Information Generation Processing>>

A specific example different from that described above is described below with reference to FIG. 17 as an example of the use frequency information generation processing.

A table 1701 holds nozzle data of each line. Here, the nozzle number per line is 512, and eight values, which are specifically "0", "1", "2", "3", "4", "5", "6", and "7", are employed as the values of the driving signal selection information that can be obtained. An Nth line (referred to as a line N) is described below as an example.

In S1601, the use frequency determination unit 432 obtains the driving signal selection information of the line N as the unprocessed driving signal selection information of one Column.

In S1602, the use frequency determination unit 432 performs the count processing to analyze the data of each pixel included in the driving signal selection information of the line N and count which of the values "0" to "7" is how much used. Note that, in the example in FIG. 17, the count value of the value "4" is 130 and indicates that the value "4" is used most frequently, and the value "0" (the count value: 90) is used most frequently next to the value "4". On the other hand, it can be seen that the value "2" (count value: 0) is never used.

In S1603, the use frequency determination unit 432 determines the use frequency order (rank), assuming that the use frequency is high in descending order of the count value, by using the count value derived in S1602. Note that, in the example of FIG. 17, the use frequency order is "4", "0", "7", "6", "3", "1", "5", and "2", and in a table 1703, a field of the line N and the value "4" holds 0 indicating the highest rank in the order of the use frequency. Note that, in the present example, the highest rank is expressed as 0 while the lowest rank is expressed as 7.

In S1604, the use frequency determination unit 432 outputs the use frequency information of the line N determined in S1603.

The processing of S1601 to S1604 described above is performed on all the lines.

<Operation of Driving Signal Control Unit>

An operation of the driving signal control unit 408 is described with reference to FIGS. 18 and 19A to 19C.

FIG. 18 is a diagram describing an example of a driving signal control table drive_tab used by the driving signal control unit 408 in the present embodiment. Regarding the driving signal control table drive_tab, it is possible to use the driving signal control table drive_tab by the driving signal control unit 408 with the CPU 410 making setting to write an appropriate value into the register unit 434. The driving signal control table drive_tab holds the value corresponding to the instruction by the CPU 410 regarding whether to drive the piezoelectric element with which degree of the signal value of the driving signal for every predetermined time. In the present embodiment, a digital value of 8-bit, which is specifically an arbitrary value within a range from 0 or greater to 255 or smaller, is employed as the value that is set and held in the drive_tab. Additionally, i indicates a multiple indicating how much predetermined time is multiplied, and if i=n, it means predetermined time×n. The initial value of i is 0. That is, i=0 indicates the beginning of the driving signal.

Additionally, in order to generate waveforms of the multiple types of the driving signals such as the non-ejection, the large size ink droplet, and the small size ink droplet, the driving signal control table drive_tab holds a value group corresponding to each of the types. FIG. 18 illustrates three types of the driving signal control tables drive_tab, in other words, drive_tab[0], drive_tab[1], and drive_tab[2]. The drive_tab[0] is an example of the driving signal control table used to drive the nozzle with no ejection. Likewise, the drive_tab[1] is an example of the driving signal control table used to drive the nozzle with the large size ink droplet, and the drive_tab[2] is an example of the driving signal control table used to drive the nozzle with the small size ink droplet.

Figure 19A:
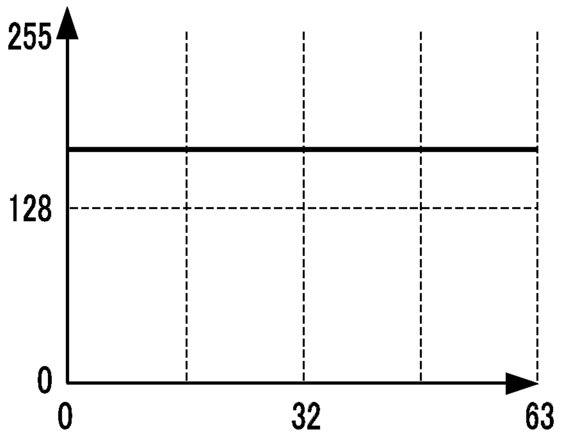
FIGS. 19A to 19C are diagrams illustrating a waveform of the driving signal.
Figure 19B:
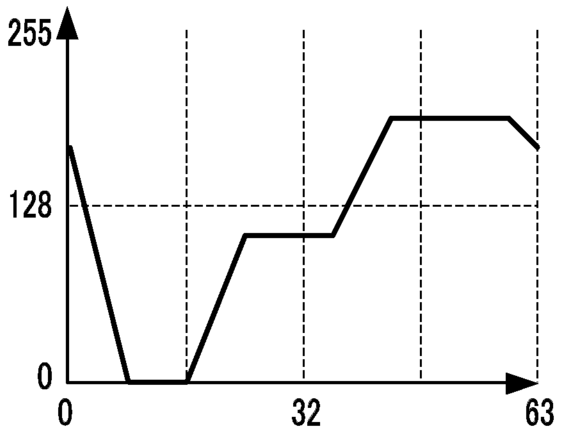
Figure 19C:
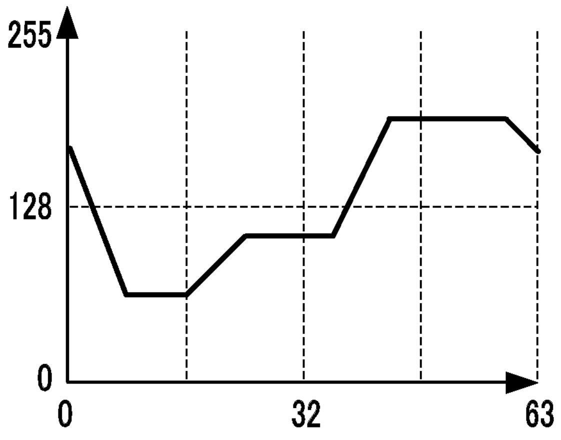

FIGS. 19A to 19C illustrate a graph based on each of the three types of the driving signal control tables drive_tab illustrated in FIG. 18, and the horizontal axis is i, and the vertical axis is the value in each graph. Specifically, FIG. 19A indicates the driving signal control table drive_tab[0] used to drive the nozzle with no ejection. FIG. 19B indicates the driving signal control table drive_tab[1] used to drive the nozzle with the large size ink droplet. FIG. 19C indicates the driving signal control table drive_tab[2] used to drive the nozzle with the small size ink droplet.

The driving signal generated by the driving signal generation unit 411 based on the table indicated in FIG. 19C is set to have a smaller amplitude than that of the driving signal generated by the driving signal generation unit 411 based on the table indicated in FIG. 19B. As a result, a degree of expansion and a degree of contraction of the pressure chamber 304 are reduced, and the ink amounts to be ejected are varied. Usually, as the amplitude is greater, the ink droplet to be ejected is larger.

The driving signal control unit 408 controls the waveforms of the multiple driving signals outputted by the driving signal generation unit 411 by changing the value transmitted to the driving signal generation unit 411 for every predetermined time by using the driving signal control tables drive_tab. Here, the driving signal control unit 408 of the present embodiment performs processing of replacing the driving signal control tables drive_tab by using the use frequency information PriTab such that the values are in descending order of the use frequency of the type in each Column. The replacement processing is described later.

<Replacement of Control Signal of Driving Waveform and Replacement of Driving Signal Selection Information>

Replacement of the control signal of the driving waveform and replacement of the driving signal selection information executed by the printing control unit 407 in the present embodiment are described with reference to FIGS. 20 to 23.

Figure 20:
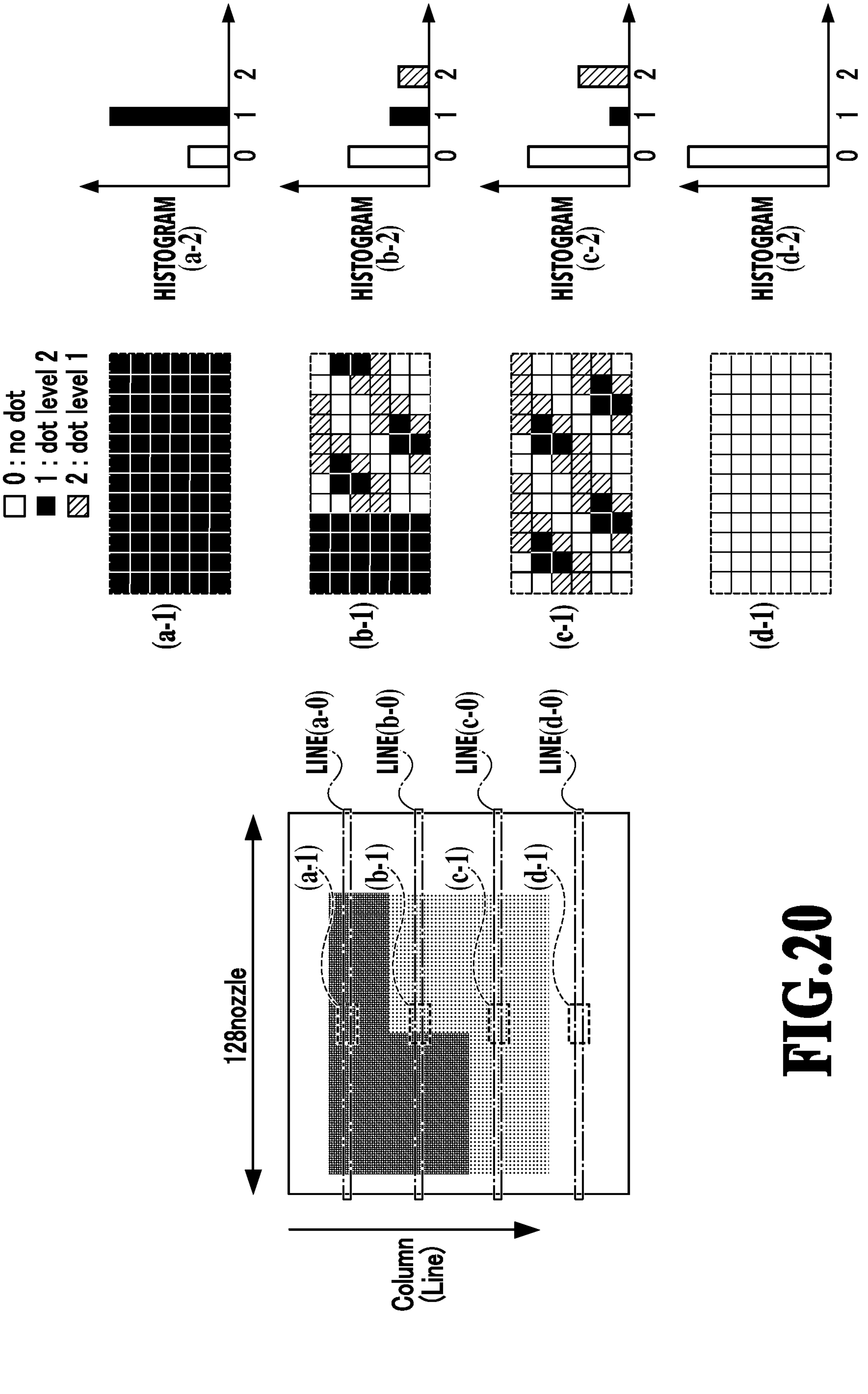
FIG. 20 is a diagram describing driving signal selection information.

An example of the image data expressing the driving signal selection information processed by the use frequency determination unit 432 is illustrated on the left side in FIG. 20. Regions (a-1), (b-1), (c-1), and (d-1) with broken lines in this image each indicate a part of the driving signal selection information (image), respectively. Additionally, FIG. 20 also illustrates enlarged views (a-1), (b-1), (c-1), and (d-1) as diagrams enlarging the broken line regions.

A histogram (a-2) illustrates which of the three values of the driving signal selection information (that is, 0, 1, and 2) is how much used in one Column corresponding to the region (a-1), which is a line (a-0) in the present example.

Additionally, a histogram (b-2) illustrates which of the three values of the driving signal selection information is how much used in a line (b-0) corresponding to the region (b-1). The same applies to a histogram (c-2) and a histogram (d-2). The histograms are result examples of the count processing by the use frequency determination unit 432.

FIG. 21A illustrates the use frequency information corresponding to the histogram (a-2) in FIG. 20 that is the use frequency information PriTab derived by the determination by the use frequency determination unit 432. Likewise, FIG. 21B corresponds to the histogram (b-2), FIG. 21C corresponds to the histogram (c-2), and FIG. 21D corresponds to the histogram (d-2).

The image of the driving signal selection information depends on the image of the printing target inputted by a user using the printing apparatus, and the waveform indicated by the driving signal used for each nozzle is different for each region. For example, in the region (a-1), it can be seen from the distribution of the use frequencies of the values (of the driving signal selection information) in the line (a-0) that "1" indicating the large size ink droplet is used frequently. On the other hand, in the region (b-1) or the region (c-1), the waveforms of various types of the driving signals are used.

Figure 22:
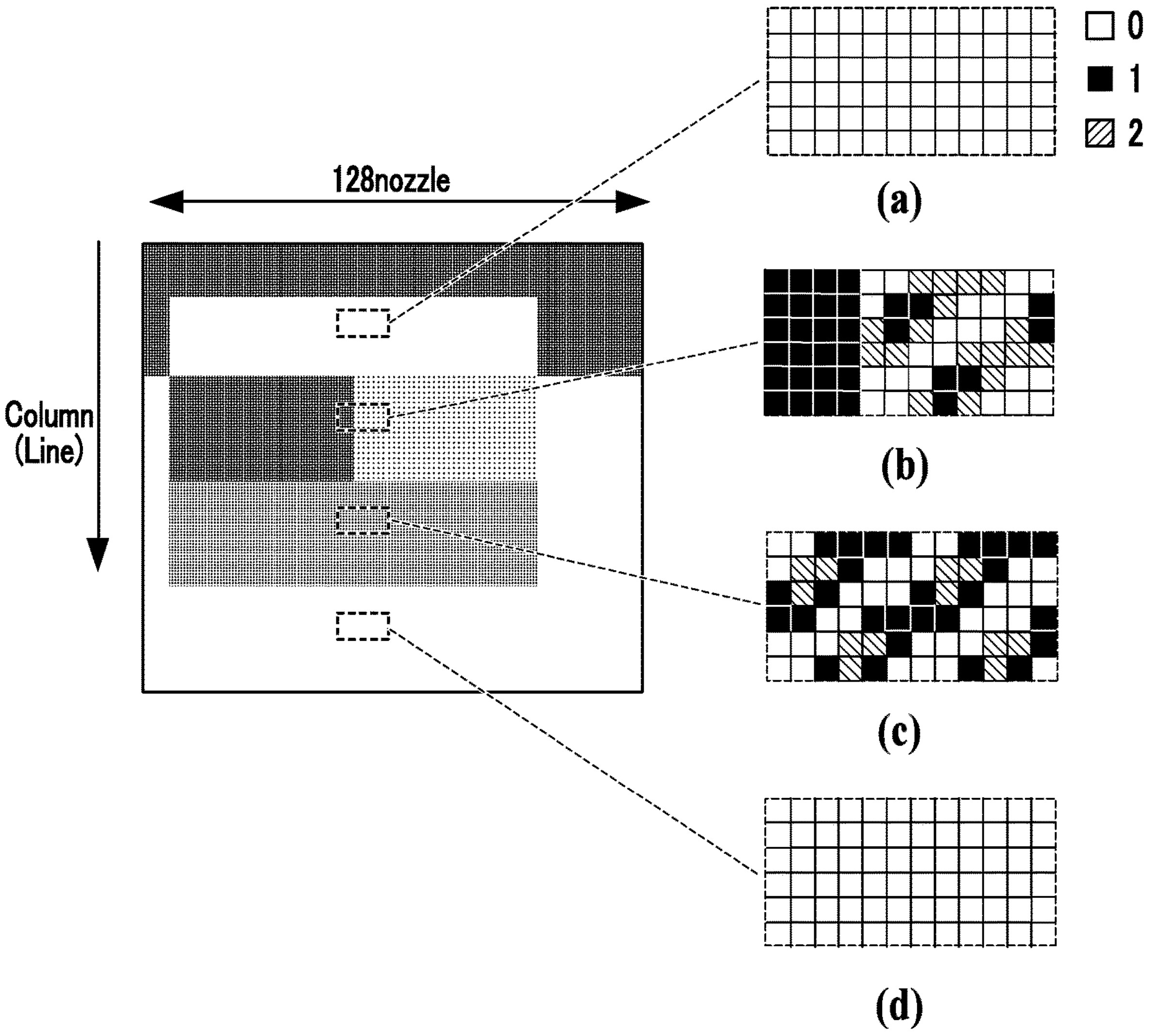
FIG. 22 is a diagram describing replacement processing of the driving signal selection information.

As an example of the replacement processing by the driving signal selection information transmission unit 409, FIG. 22 illustrates the image data expressing the driving signal selection information as a result of the replacement processing performed on the driving signal selection information illustrated in FIG. 20. Additionally, the reference numerals (a), (b), (c), and (d) in FIG. 22 each indicate an enlarged view of the corresponding region of a part of the driving signal selection information after the replacement processing.

In the Column (one line) corresponding to the region (a) illustrated in FIG. 22, "1" is used most frequently regarding the use frequencies of the values of the driving signal selection information as illustrated in FIG. 21A, and following this, "0" and "2" are used; therefore, the use frequencies are in the order of {1, 0, 2}.

As described above, in a case of replacing the values of the driving signal selection information based on the use frequencies, the driving signal selection information transmission unit 409 replaces the value "0" of the driving signal selection information in the region (a-1) in FIG. 20 with the value "1". Additionally, the value "1" of the driving signal selection information in the region (a-1) in FIG. 20 is replaced with the value "0", and the value "2" is replaced with the value "2".

As with the region (a), the replacement based on the use frequency is also performed in the regions (b), (c), and (d) in FIG. 22. Thus, in any Columns, the values of the driving signal selection information are replaced so as to be in the order of the type of the driving waveform used most frequently.

Figure 23:
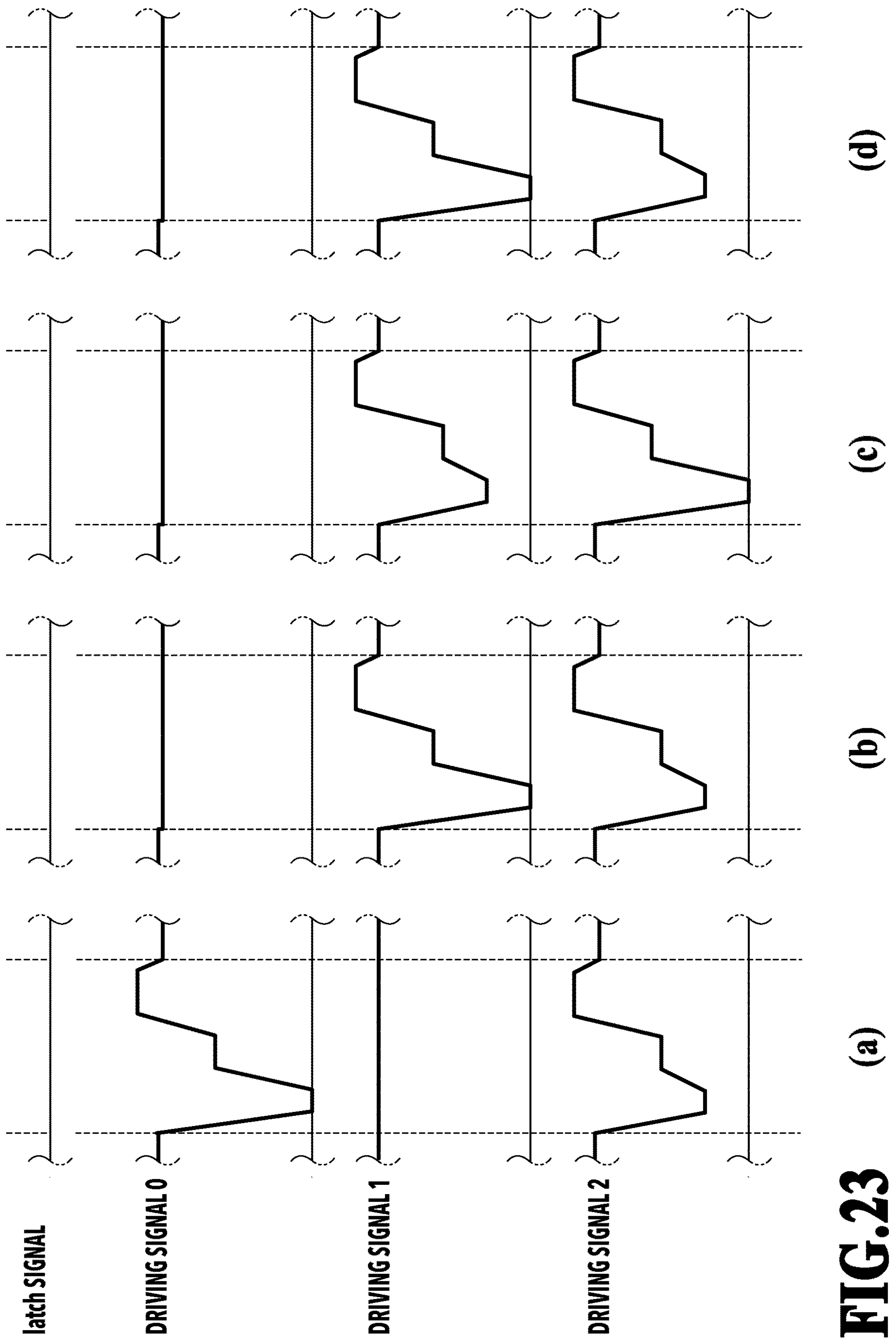
FIG. 23 is a diagram describing the driving signal communicated to the wiring line.

FIG. 23 illustrates the waveform of the driving signal generated by the driving signal generation unit 411 and corresponding to each of the driving signal wiring lines in the Column corresponding to each of the regions (a) to (d) in FIG. 22 as a result of the control signal transmission by the driving signal control unit 408 in the present embodiment.

In the Column (one line) corresponding to the region (a) illustrated in FIG. 22, "1" is used most frequently regarding the use frequencies of the values of the driving signal selection information as illustrated in FIG. 21A, and following this, "0" and "2" are used; therefore, the use frequencies are in the order of {1, 0, 2}.

Accordingly, the driving signal control unit 408 performs control based on the driving signal control table drive_tab[1] by associating the driving signal control table drive_tab[1] with the driving signal 0 based on the use frequency.

Additionally, the driving signal control unit 408 performs control based on the driving signal control table drive_tab[1] by associating the driving signal control table drive_tab[0] with the driving signal 1 based on the use frequency. Moreover, the driving signal control unit 408 performs control based on the driving signal control table drive_tab[2] by associating the driving signal control table drive_tab[2] with the driving signal 2 based on the use frequency.

As with the region (a), the waveform of the driving signal is controlled by replacing the driving signal control table drive_tab to be used based on the use frequency also in the regions (b), (c), and (d) in FIG. 22. Thus, the control signal is transmitted such that the driving signal wiring line that can correspond to the driving current that can drive many piezoelectric elements (in other words, a wider driving signal wiring line) is allocated in descending order of the driving signal of the type of high use frequency in each Column.

Effect of Present Embodiment

As described above, with the replacement of the control signal of the driving waveform and the replacement of the driving signal selection information so as to allocate the driving signals in descending order of the type of high use frequency in each Column, it is possible to use a wiring line according to the number of the driven elements. As a result, for example, as illustrated in FIGS. 24 and 25, it is possible to narrow the width of the flexible electric wiring substrate and to implement downsizing of the printing head.

Figure 24:
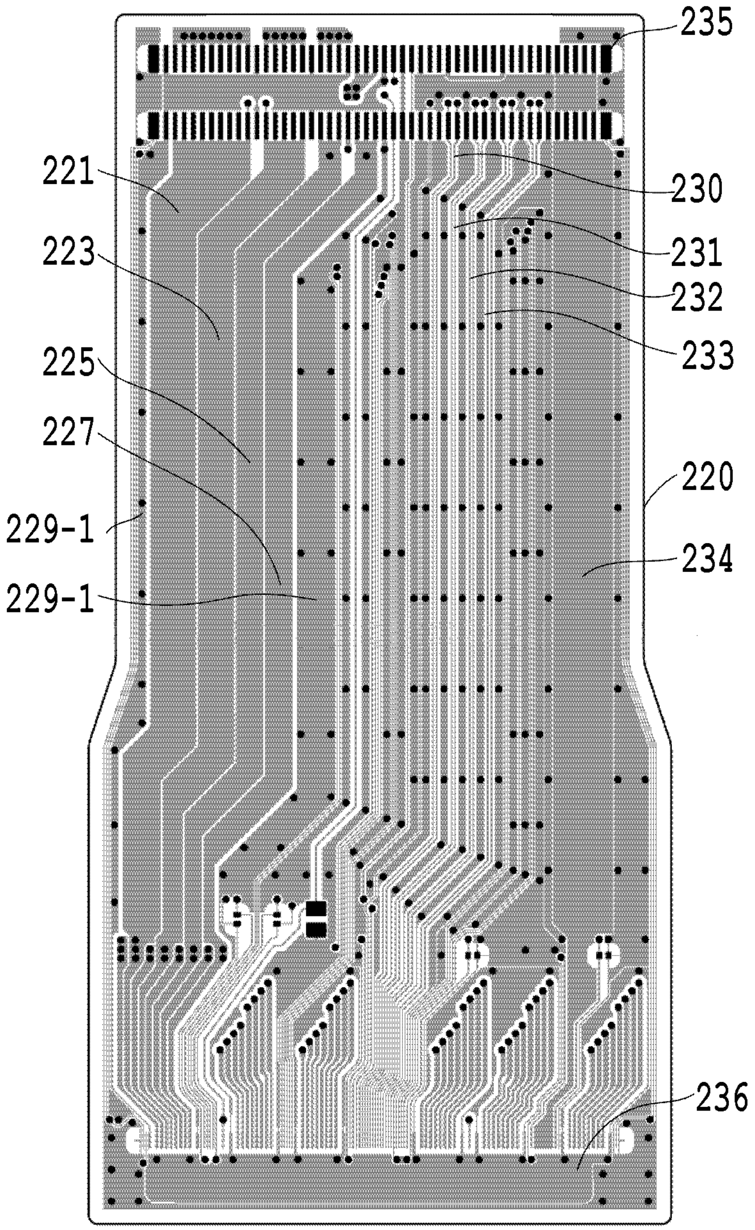
FIG. 24 is a schematic view of a flexible electric wiring substrate.
Figure 25:
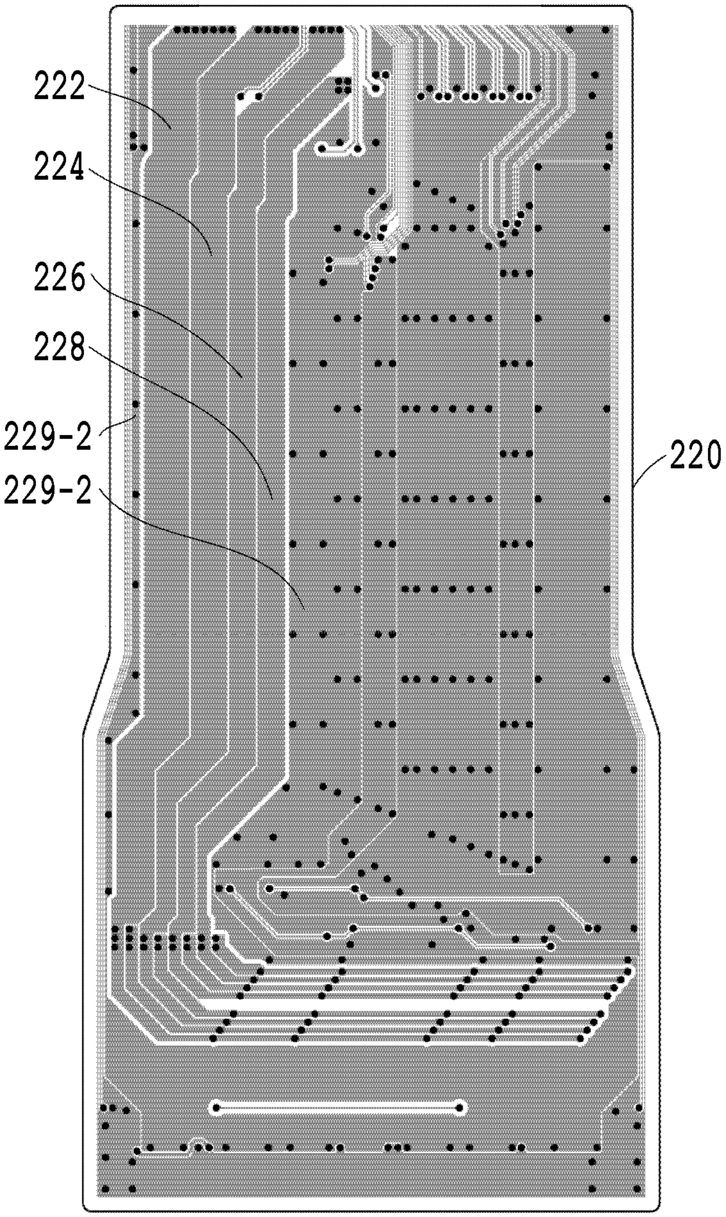
FIG. 25 is a schematic view of a flexible electric wiring substrate.

FIG. 24 illustrates a wiring line of a first layer of a flexible electric wiring substrate 220 in the present embodiment. FIG. 25 illustrates a wiring line of a second layer of the flexible electric wiring substrate 220 in the present embodiment and illustrates a state transparent from the first layer side. A laminate structure of the flexible electric wiring substrate 220 is formed by the first layer and the second layer.

On the first layer illustrated in FIG. 24, a first driving signal wiring line 221 that can correspond to the driving current at the time of simultaneous driving of all (100%) the piezoelectric elements (in other words, can flow the current as described above) is wired. Additionally, on the first layer, a second driving signal wiring line 223 that can correspond to the current that simultaneously drives 75% of all the piezoelectric elements is wired. Likewise, a third driving signal wiring line 225 that can correspond to the current that simultaneously drives 50% of all the piezoelectric elements is wired, and a fourth driving signal wiring line 227 that can correspond to the current that simultaneously drives 33% of all the piezoelectric elements is wired.

A driving signal feedback current wiring line 229-1 is a return-path of the driving signal and can correspond to a feedback current of the driving signal at the time of 100% driving. As other configurations, a mounting unit 236 to mount the driving signal selection unit selectively switching the driving signal applied to the piezoelectric element is included as illustrated in FIG. 24. Additionally, a first control signal line 231, a second control signal line 232, and a third control signal line 233 that communicate the control signal for driving the driving signal selection unit, and a synchronization signal line 230 are included. Moreover, a power supply line that supplies power to the driving signal selection unit, a bypass capacitor for power supply, a connection unit 235 for connection with the head substrate connected to the printing apparatus body, a residual vibration signal line 234 that communicates the residual vibration of the piezoelectric element to the body, and a reference voltage line fixed to a constant potential are arranged.

On the second layer illustrated in FIG. 25, a first driving signal wiring line 222 that can correspond to the driving current at the time of simultaneous driving of all (100%) the piezoelectric elements (in other words, can flow the current as described above) is wired. Additionally, on the second layer, a second driving signal wiring line 224 that can correspond to the current that simultaneously drives 75% of all the piezoelectric elements is wired. Likewise, a third driving signal wiring line 226 that can correspond to the current that simultaneously drives 50% of all the piezoelectric elements is wired, and a fourth driving signal wiring line 228 that can correspond to the current that simultaneously drives 33% of all the piezoelectric elements is wired. Moreover, on the second layer, a driving signal feedback current wiring line 229-2 that can correspond to a feedback current of the driving signal at the time of 100% driving, a reference voltage line fixed to a constant potential, and the like are arranged.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to narrow the width of an electric wiring substrate and downsize a printing head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056148, filed Mar. 30, 2022, which is hereby incorporated by reference wherein in its entirety.

What is claimed is:

1. An inkjet printing apparatus, comprising:
a printing head including a plurality of nozzles ejecting ink and a piezoelectric element corresponding to each of the plurality of the nozzles;
a control unit configured to control printing by the printing head;
a signal generation unit configured to generate a driving signal to drive the piezoelectric element;
a selection unit configured to select for each nozzle one type of the driving signal out of a plurality of types of the driving signals generated by the signal generation unit; and
a plurality of wiring lines having different wiring widths from each other to communicate the plurality of types of the driving signals supplied to the selection unit from the signal generation unit, wherein
the control unit controls the signal generation unit by using use frequency information indicating each type of use frequency of the plurality of types of the driving signals, and
the control unit controls the selection unit by using the use frequency information.

2. The inkjet printing apparatus according to claim 1, wherein
a wiring line with the widest wiring width out of the plurality of the wiring lines is allocated to a type of the driving signal that is used most frequently out of the plurality of types of the driving signals.

3. The inkjet printing apparatus according to claim 2, wherein
the control unit further includes
an information generation unit configured to generate first selection information to select one type of the driving signal out of the plurality of types of the driving signals for each of the plurality of the nozzles, and
a determination unit configured to determine each type of the use frequency of the plurality of types of the driving signals by using the first selection information, wherein
the determination unit generates the use frequency information.

4. The inkjet printing apparatus according to claim 3, wherein
the determination unit executes count processing to count which of values that can be obtained as values of the first selection information is how much used.

5. The inkjet printing apparatus according to claim 4, wherein
the determination unit executes the count processing by a predetermined unit of driving.

6. The inkjet printing apparatus according to claim 5, wherein
the predetermined unit of driving is one nozzle line arrayed in a sub-scanning direction in the printing head.

7. The inkjet printing apparatus according to claim 6, wherein
a current of a case of simultaneously driving the piezoelectric elements corresponding to all the nozzles included in the one nozzle line can flow in the wiring line with the widest wiring width.

8. The inkjet printing apparatus according to claim 5, wherein
the control unit further includes an information transmission unit configured to transmit second selection information, which is generated by replacing each of the values of the first selection information by using the use frequency information, to the selection unit, and
the selection unit selects the one type of the driving signal by using the second selection information.

9. The inkjet printing apparatus according to claim 8, wherein
the information transmission unit generates the second selection information by replacing the value of the first selection information with a value indicating a rank of the use frequency according to the order of the use frequencies of the values of the first selection information in the predetermined unit of driving.

10. The inkjet printing apparatus according to claim 5, wherein
the control unit further includes a signal transmission unit configured to transmit a control signal based on selection whether the signal generation unit generates which type of the driving signal for which wiring line out of the plurality of wiring lines to the signal generation unit by using the use frequency information.

11. The inkjet printing apparatus according to claim 10, wherein
the signal transmission unit generates the control signal by using the use frequency information.

12. The inkjet printing apparatus according to claim 10, wherein
a driving signal control table expressing a signal waveform by a plurality of signal values including signal values for every predetermined time is associated for each type of the plurality of types of the driving signals, and
the signal transmission unit switches the driving signal control table to be used by using the use frequency information.

13. The inkjet printing apparatus according to claim 1, wherein
a signal waveform is different for each type of the plurality of types of the driving signals, and
the plurality of types of the driving signals include a first driving signal with a large ink droplet size, a second driving signal with a small ink droplet size, and a third driving signal with no ink ejection.

14. A control method of an inkjet printing apparatus including a printing head including a plurality of nozzles ejecting ink and a piezoelectric element corresponding to each of the plurality of the nozzles,
a control unit configured to control printing by the printing head,
a signal generation unit configured to generate a driving signal to drive the piezoelectric element,
a selection unit configured to select for each nozzle one type of the driving signal out of a plurality of types of the driving signals generated by the signal generation unit, and
a plurality of wiring lines having different wiring widths from each other to communicate the plurality of types of the driving signals supplied to the selection unit from the signal generation unit, the control method comprising the steps of:
controlling by the control unit the signal generation unit by using use frequency information indicating each type of use frequency of the plurality of types of the driving signals, and
controlling by the control unit the selection unit by using the use frequency information.

15. A non-transitory computer readable storage medium storing a program causing a computer to execute a control method of an inkjet printing apparatus including a printing head including a plurality of nozzles ejecting ink and a piezoelectric element corresponding to each of the plurality of the nozzles, a control unit configured to control printing by the printing head, a signal generation unit configured to generate a driving signal to drive the piezoelectric element, a selection unit configured to select for each nozzle one type of the driving signal out of a plurality of types of the driving signals generated by the signal generation unit, and a plurality of wiring lines having different wiring widths from each other to communicate the plurality of types of the driving signals supplied to the selection unit from the signal generation unit, the control method comprising the steps of:

controlling by the control unit the signal generation unit by using use frequency information indicating each type of use frequency of the plurality of types of the driving signals, and controlling by the control unit the selection unit by using the use frequency information.

* * * * *